US012633987B2

(12) United States Patent
    Rahman et al.

(10) Patent No.: US 12,633,987 B2
(45) Date of Patent: May 19, 2026

(54) CSI REPORTING IN MIMO COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Coppell, TX (US); Gilwon Lee, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 18/516,860

(22) Filed: Nov. 21, 2023

(65) Prior Publication Data

US 2024/0187067 A1 Jun. 6, 2024

Related U.S. Application Data

(60) Provisional application No. 63/428,964, filed on Nov. 30, 2022.

(51) Int. Cl.
    *H04B 7/06* (2006.01)
    *H04W 24/10* (2009.01)

(52) U.S. Cl.
    CPC .......... *H04B 7/0626* (2013.01); *H04W 24/10* (2013.01)

(58) Field of Classification Search
    None
    See application file for complete search history.

(56) References Cited

U.S. PATENT DOCUMENTS

| | | | |
|---|---|---|---|
| 9,985,709 B2 | 5/2018 | Park et al. | |
| 10,484,126 B2 | 11/2019 | Harrison et al. | |
| 12,170,561 B2 * | 12/2024 | Chung | H04B 7/0478 |
| 2018/0076871 A1 * | 3/2018 | Rahman | H04B 7/0634 |

FOREIGN PATENT DOCUMENTS

| | | |
|---|---|---|
| EP | 4002713 A1 | 5/2022 |
| WO | 2021159460 A1 | 8/2021 |

OTHER PUBLICATIONS

International Search Report and Written Opinion issued Mar. 8, 2024 regarding International Application No. PCT/KR2023/019630, 11 pages.
Guo et al., "Overview of Deep Learning-based CSI Feedback in Massive MIMO Systems", arXiv:2206.14383v1, Jun. 2022, 28 pages.

(Continued)

*Primary Examiner* — Hong S Cho

(57) ABSTRACT

Apparatuses and methods for channel state information (CSI) reporting in next generation multiple-input multiple-output (MIMO) systems. A method performed by a user equipment (UE) includes receiving information about a CSI report, the report based on at least two components: a set of basis entities and a set of coefficients; based on the information, determining the set of basis entities and the set of coefficients; and transmitting the CSI report including at least one indicator indicating at least one of the set of basis entities and the set of coefficients. The set of basis entities is based on X dimensions. The set of coefficients is not based on the X dimensions and is from a set of convolutional-based coefficients. X is associated with the CSI report and $X \geq 1$.

20 Claims, 12 Drawing Sheets

1400

Receive information about a CSI report that is based on a set of basis entities and a set of coefficients. ~1410

Determine the set of basis entities and the set of coefficients. ~1420

Transmit the CSI report including at least one indicator indicating at least one of the set of basis entities and the set of coefficients. ~1430

(56)         References Cited

OTHER PUBLICATIONS

"3rd Generation Partnership Project; Technical Specification Group Radio Access Network; Evolved Universal Terrestrial Radio Access (E-UTRA); Physical channels and modulation (Release 17)," 3GPP TS 36.211 V17.0.0, Dec. 2021, 250 pages.

"3rd Generation Partnership Project; Technical Specification Group Radio Access Network; Evolved Universal Terrestrial Radio Access (E-UTRA); Multiplexing and channel coding (Release 17)," 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)," 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)," 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)," 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)," 3GPP TR 22.891 V1.2.0, Nov. 2015, 96 pages.

"3rd Generation Partnership Project; Technical Specification Group Radio Access Network; NR; Multiplexing and channel coding (Release 17)," 3GPP TS 38.212 V17.0.0, Dec. 2021, 190 pages.

"3rd Generation Partnership Project; Technical Specification Group Radio Access Network; NR; Physical layer procedures for data (Release 17)," 3GPP TS 38.214 V17.0.0, Dec. 2021, 217 pages.

"5G; NR; Physical channels and modulation (3GPP TS 38.211 version 17.3.0 Release 17)", ETSI TS 138 211 V17.3.0, Sep. 2022, 141 pages.

* cited by examiner

Antenna port layout $N_2$-1  ✕  ✕   ✕  ✕      ✕

⋮

2$^{nd}$ dim.

✕  ✕  ✕  ✕  ⋯  ✕
✕  ✕  ✕  ✕      ✕
0 ✕  ✕  ✕  ✕      ✕
0                    $N_1$-1

1$^{st}$ dim.

Single antenna group                     Multiple antenna group $Ng$ = 1                     $Ng$ = 2                     $Ng$ = 4

1400

Receive information about a CSI report that is based on a set of basis entities and a set of coefficients. ~1410

Determine the set of basis entities and the set of coefficients. ~1420

Transmit the CSI report including at least one indicator indicating at least one of the set of basis entities and the set of coefficients. ~1430

CSI REPORTING IN MIMO COMMUNICATION SYSTEMS

CROSS-REFERENCE TO RELATED AND CLAIM OF PRIORITY

The present application claims priority under 35 U.S.C. § 119(e) to U.S. Provisional Patent Application No. 63/428, 964 filed on Nov. 30, 2022, which is hereby incorporated by reference in its entirety.

TECHNICAL FIELD

The present disclosure relates generally to wireless communication systems and, more specifically, the present disclosure is related to apparatuses and methods for channel state information (CSI) reporting in multiple-input multiple-output (MIMO) communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to CSI reporting in next generation MIMO systems.

In one embodiment, a user equipment (UE) is provided. The UE includes a transceiver configured to receive information about a channel state information (CSI) report. The report is based on at least two components: a set of basis entities and a set of coefficients. The UE further includes a processor operably coupled to the transceiver. The processor, based on the information, is configured to determine the set of basis entities and the set of coefficients. The transceiver is further configured to transmit the CSI report including at least one indicator indicating at least one of the set of basis entities and the set of coefficients. The set of basis entities is based on X dimensions. The set of coefficients is not based on the X dimensions and is from a set of convolutional-based coefficients. X is associated with the CSI report and X≥1.

In another embodiment, a base station (BS) is provided. The BS includes a processor and a transceiver operably coupled with the processor. The transceiver is configured to transmit information about a CSI report, which is based on at least two components: a set of basis entities and a set of coefficients, and receive the CSI report including at least one indicator indicating at least one of the set of basis entities and the set of coefficients. The set of basis entities is based on X dimensions. The set of coefficients is not based on the X dimensions and is from a set of convolutional-based coefficients. X is associated with the CSI report and X≥1.

In yet another embodiment, a method performed by a UE is provided. The method includes receiving information about a CSI report, the report based on at least two components: a set of basis entities and a set of coefficients; based on the information, determining the set of basis entities and the set of coefficients; and transmitting the CSI report including at least one indicator indicating at least one of the set of basis entities and the set of coefficients. The set of basis entities is based on X dimensions. The set of coefficients is not based on the X dimensions and is from a set of convolutional-based coefficients. X is associated with the CSI report and X≥1.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-14, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 36.211 v17.0.0, "E-UTRA, Physical channels and modulation;" [2] 3GPP TS 36.212 v17.0.0, "E-UTRA, Multiplexing and Channel coding;" [3] 3GPP TS 36.213 v17.0.0, "E-UTRA, Physical Layer Procedures;" [4] 3GPP TS 36.321 v17.0.0, "E-UTRA, Medium Access Control (MAC) protocol specification;" [5] 3GPP TS 36.331 v17.0.0, "E-UTRA, Radio Resource Control (RRC) Protocol Specification;" [6] 3GPP TR 22.891 v1.2.0; [7] 3GPP TS 38.212 v17.0.0, "E-UTRA, NR, Multiplexing and Channel coding;" [8] 3GPP TS 38.214 v17.0.0, "E-UTRA, NR, Physical layer procedures for data;" and [9] 3GPP TS 38.211 v17.3.0, "E-UTRA, NR, Physical channels and modulation."

Figure 1:
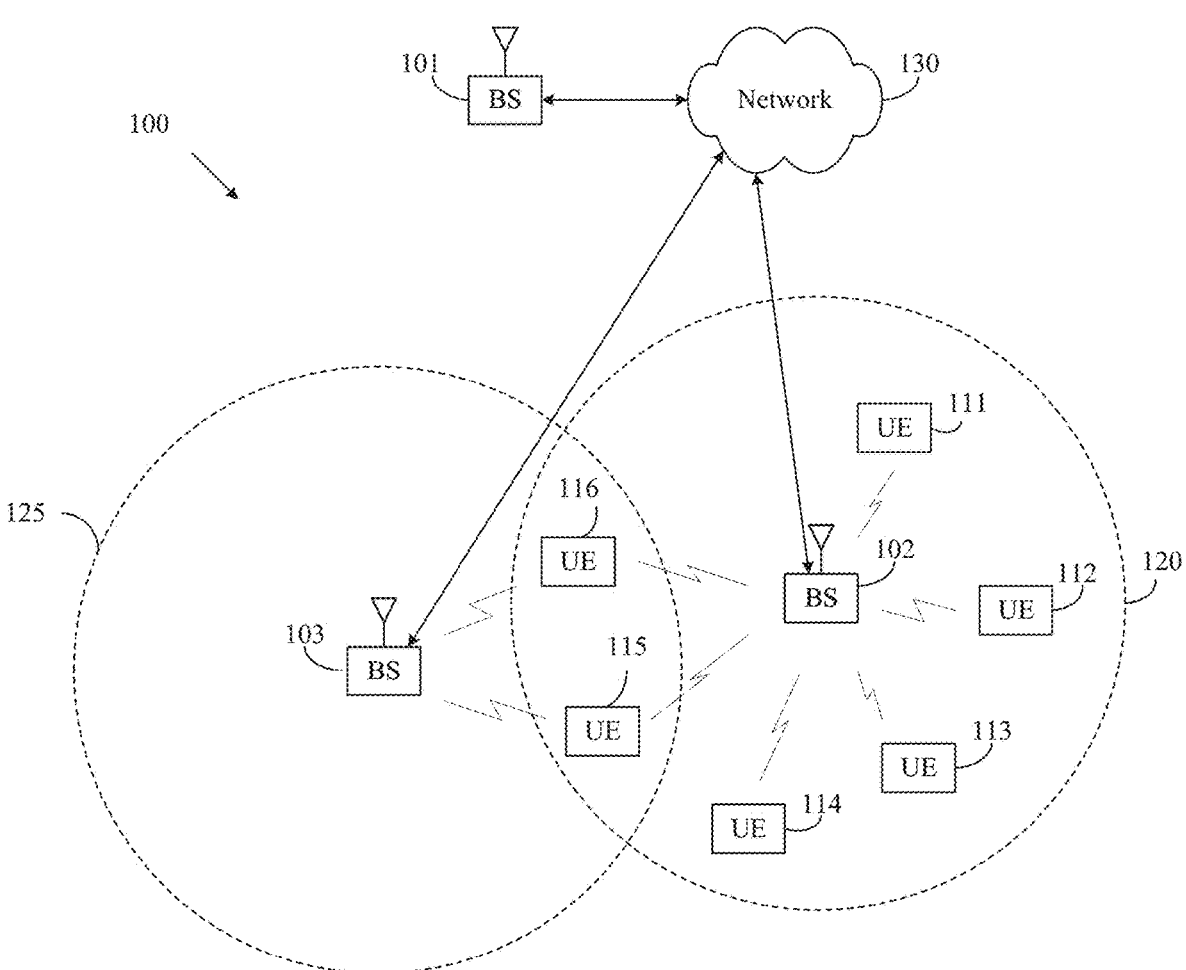
FIG. 1 illustrates an example wireless network according to embodiments of the present disclosure.
Figure 2:
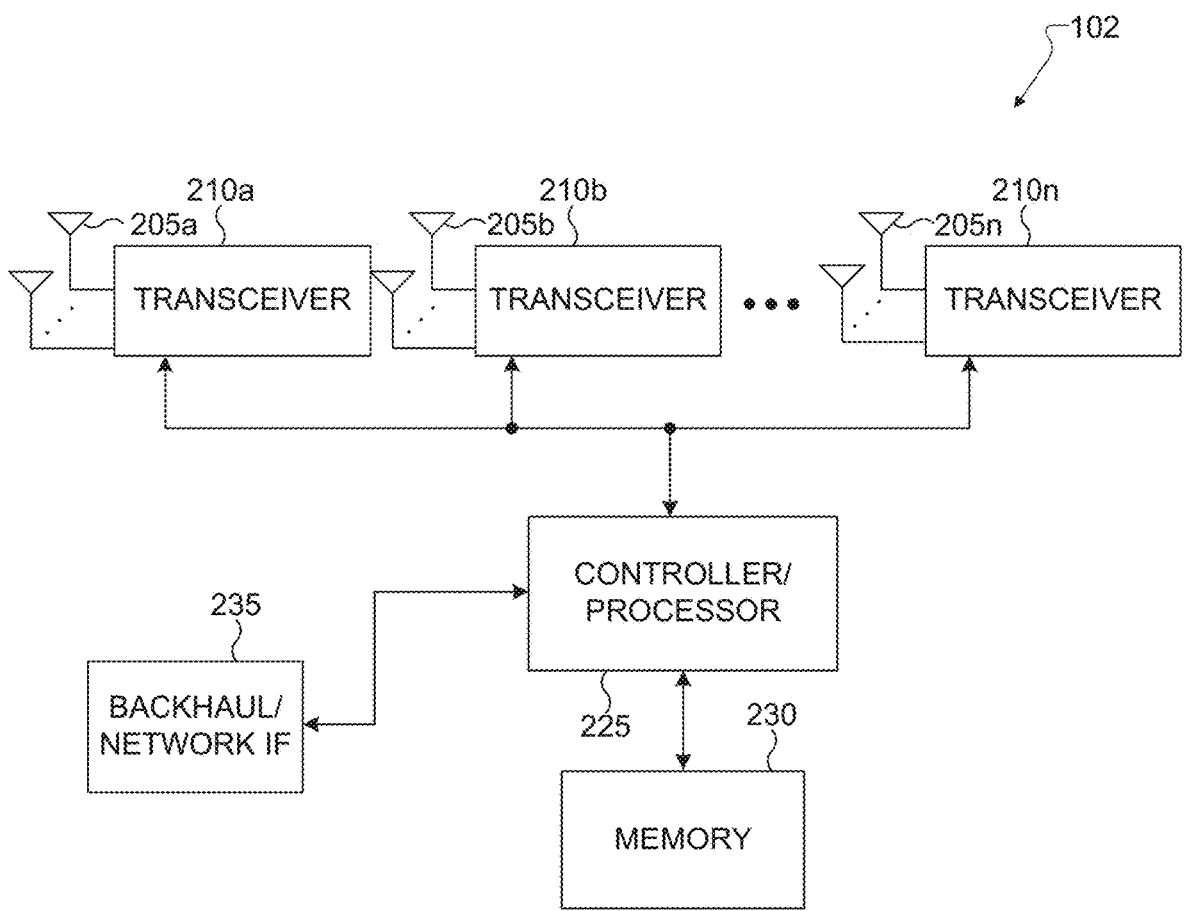
FIG. 2 illustrates an example gNodeB (gNB) according to embodiments of the present disclosure.
Figure 3:
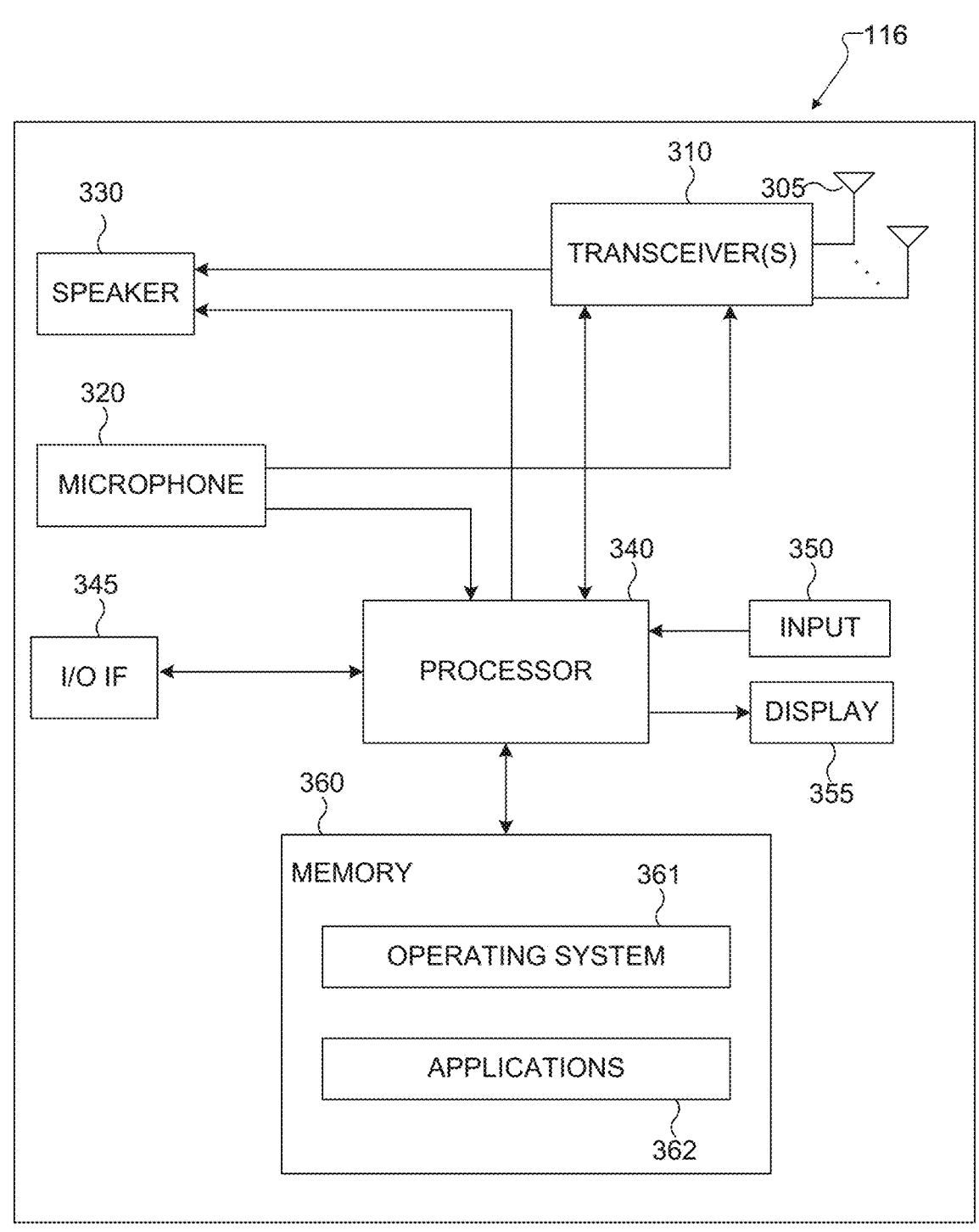
FIG. 3 illustrates an example UE according to embodiments of the present disclosure.

FIGS. 1-14 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of the present disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs)

within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing CSI reporting in MIMO communication systems. In certain embodiments, one or more of the BSs 101-103 include circuitry, programing, or a combination thereof to support CSI reporting in MIMO communication systems.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for CSI reporting in MIMO communication systems. Any of a wide variety of other functions could be supported in the gNB 102 by the controller/processor 225.

The controller/processor 225 is also capable of executing programs and other processes resident in the memory 230, such as processes to support CSI reporting in MIMO communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of uplink UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for performing CSI reporting in MIMO communication systems as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
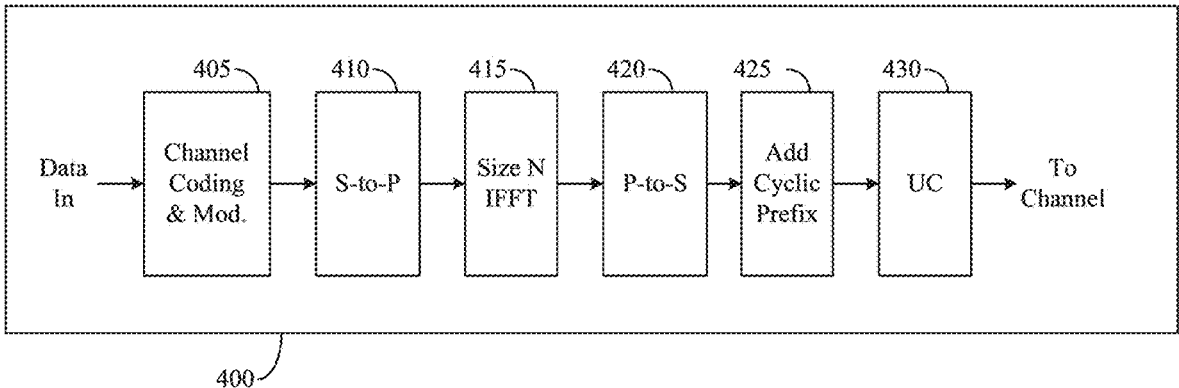
FIGS. 4A and 4B illustrate an example of a wireless transmit and receive paths according to embodiments of the present disclosure.
Figure 4B:
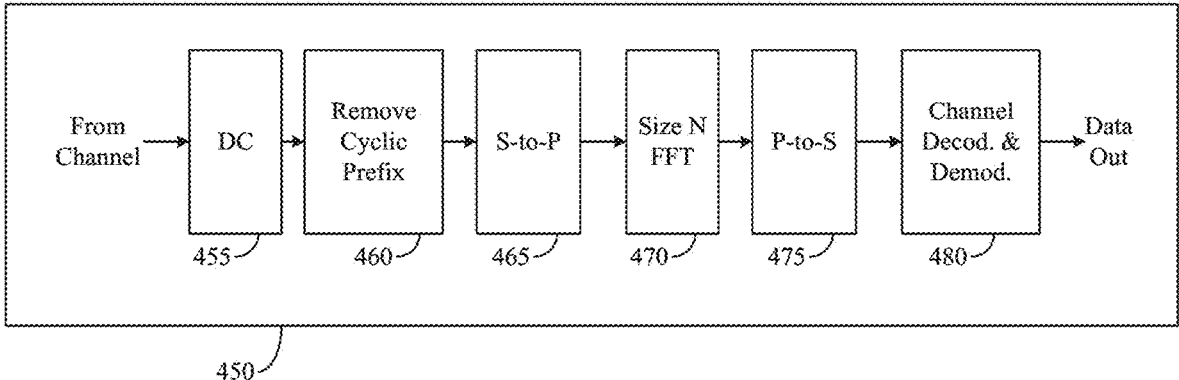

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support CSI reporting in MIMO communication systems as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
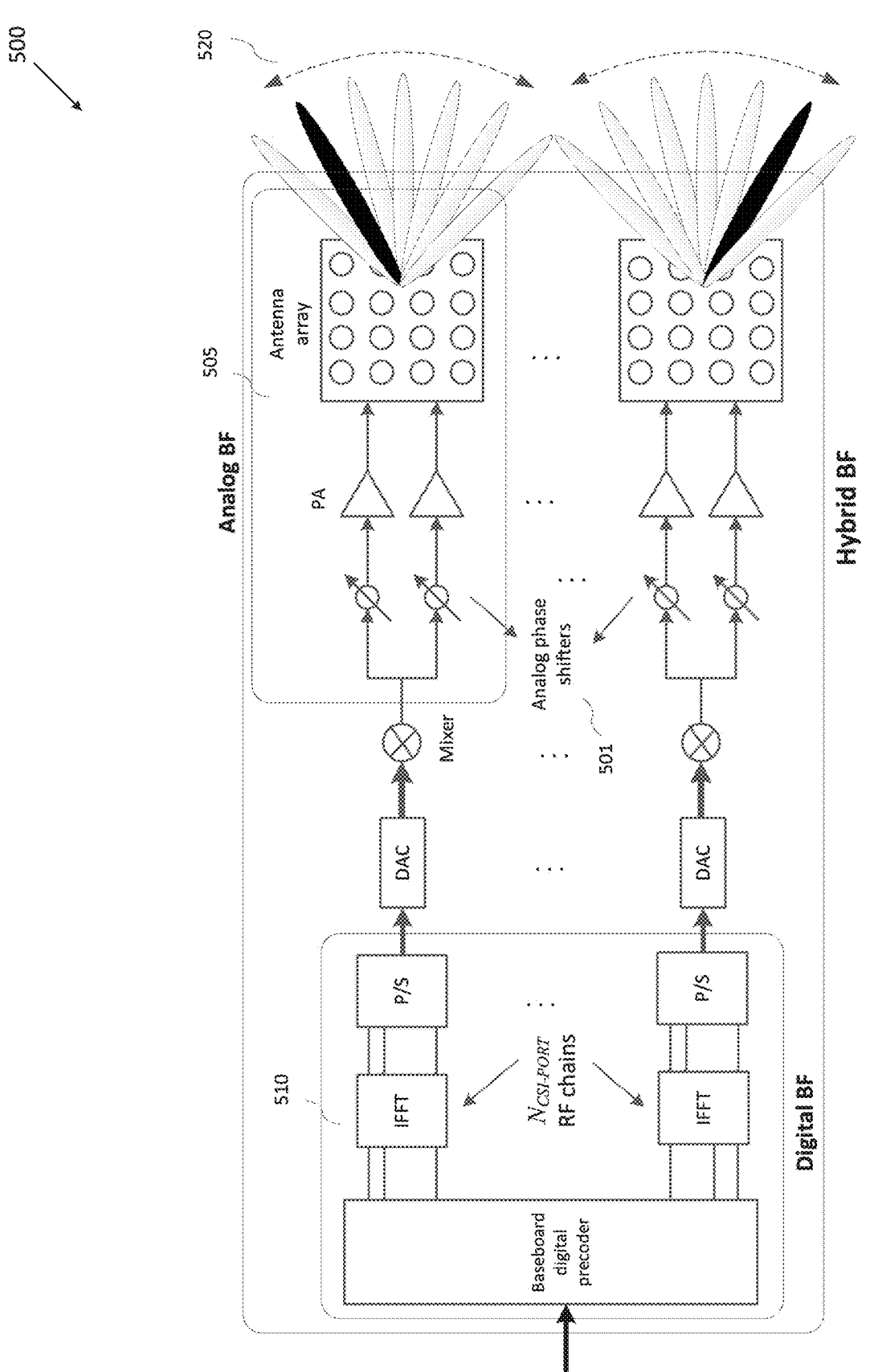
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that LTE and 5G NR support up to 32 CSI reference signal (CSI-RS) antenna ports in one CSI-RS resource which can enable an eNB or a gNB to be equipped with a large number of antenna elements (such as 64 or 128) via multiple CSI-RS resources. A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports NCSI-PORT. A digital beamforming unit 510 performs a linear combination across NCSI-PORT analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are essential to compensate for the additional path loss.

The present disclosure relates generally to wireless communication systems and, more specifically, to compression-based CSI reporting.

A communication system includes a DL that conveys signals from transmission points such as Base Stations (BSs) or NodeBs to User Equipments (UEs) and an UL that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL Control Information (DCI), and Reference Signals (RS) that are also known as pilot signals. An eNodeB transmits data information through a Physical DL Shared Channel (PDSCH). An eNodeB transmits DCI through a Physical DL Control Channel (PDCCH) or an Enhanced PDCCH (EPDCCH)—see also document and standard [3]. An eNodeB transmits acknowledgement information in response to data Transport Block (TB) transmission from a UE in a Physical Hybrid Automatic Repeat Request Indicator Channel (PHICH). An eNodeB transmits one or more of multiple types of RS including a UE-Common RS (CRS), a Channel State Information RS (CSI-RS), or a DeModulation RS (DMRS). A CRS is transmitted over a DL system BandWidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe (or slot) and can have, for example, duration of 1 millisecond.

DL signals also include transmission of a logical channel that carries system control information. A broadcast control channel (BCCH) is mapped to either a transport channel referred to as a Broadcast Channel (BCH) when it conveys a Master Information Block (MIB) or to a DL Shared Channel (DL-SCH) when it conveys a System Information Block (SIB)—see also document and standard [3] and document and standard [5]. Most system information is included in different SIBs that are transmitted using DL-SCH. A presence of system information on a DL-SCH in a subframe (or slot) can be indicated by a transmission of a corresponding PDCCH conveying a codeword with a cyclic redundancy check (CRC) scrambled with a special System Information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe (or slot) and a group of Physical resource blocks (PRBs). A transmission BW incudes frequency resource units referred to as Resource Blocks (RBs). Each RB includes $$N_{sc}^{RB}$$

sub-carriers, or Resource Elements (REs), such as 12 REs. A unit of one RB over one subframe (or slot) is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL Control Information (UCI), and UL RS. UL RS includes DMRS and Sounding RS (SRS). A UE transmits DMRS only in a BW of a respective PUSCH or Physical UL Control Channel (PUCCH). An eNodeB can use a DMRS to demodulate data signals or UCI signals. A UE transmits SRS to provide an eNodeB with an UL CSI. A UE transmits data information or UCI through a respective PUSCH or a PUCCH. If a UE requires to transmit data information and UCI in a same UL subframe (or slot), it may multiplex both in a PUSCH. UCI includes Hybrid Automatic Repeat reQuest ACKnowledgement (HARQ-ACK) information, indicating correct (ACK) or incorrect (NACK) detection for a data TB in a PDSCH or absence of a PDCCH detection (DTX), Scheduling Request (SR) indicating whether a UE has data in its buffer, Rank Indicator (RI), and Channel State Information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also document and standard [3]).

An UL subframe (or slot) includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe (or slot) symbol can be used to multiplex SRS transmissions from one or more UEs. A number of subframe (or slot) symbols that are available for data/UCI/DMRS transmission is $$N_{symb} = 2 \cdot \left( N_{symb}^{UL} - 1 \right) - N_{SRS},$$

where $N_{SRS}=1$ if a last subframe (or slot) symbol is used to transmit SRS and $N_{SRS}=0$ otherwise.

Figure 6:
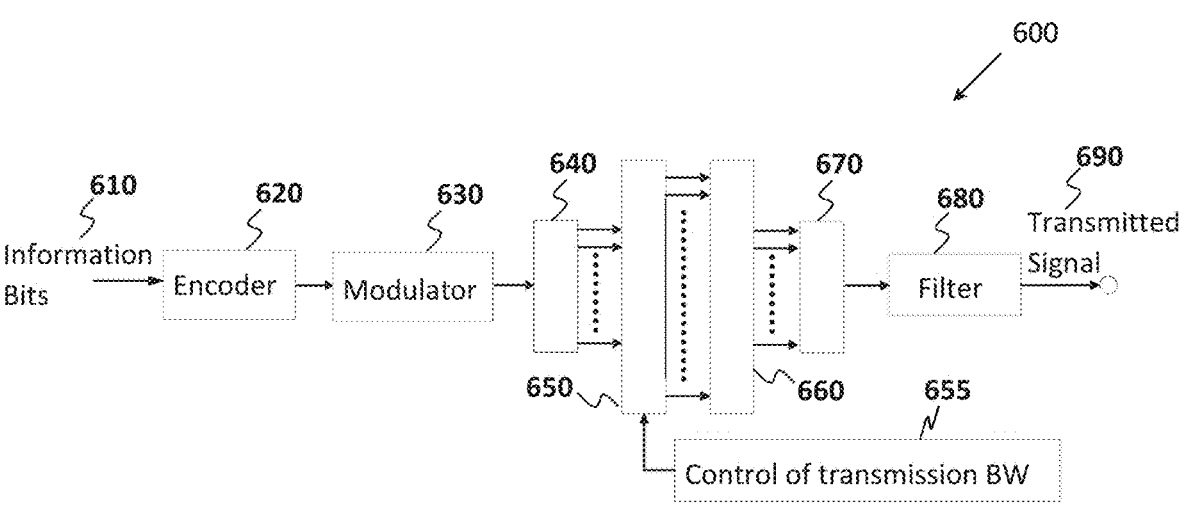
FIG. 6 illustrates an example of a transmitter structure for physical downlink shared channel (PDSCH) in a subframe according to embodiments of the present disclosure.

FIG. 6 illustrates an example of a transmitter structure 600 for PDSCH in a subframe according to embodiments of the present disclosure. For example, transmitter structure 600 can be implemented in gNB 102 of FIG. 1. This example is for illustration only and other embodiments can be used without departing from the scope of the present disclosure.

As illustrated in FIG. 6, information bits 610 are encoded by encoder 620, such as a turbo encoder, and modulated by modulator 630, for example using Quadrature Phase Shift Keying (QPSK) modulation. A Serial to Parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse Fast Fourier Transform (IFFT), the output is then serialized by a Parallel to Serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
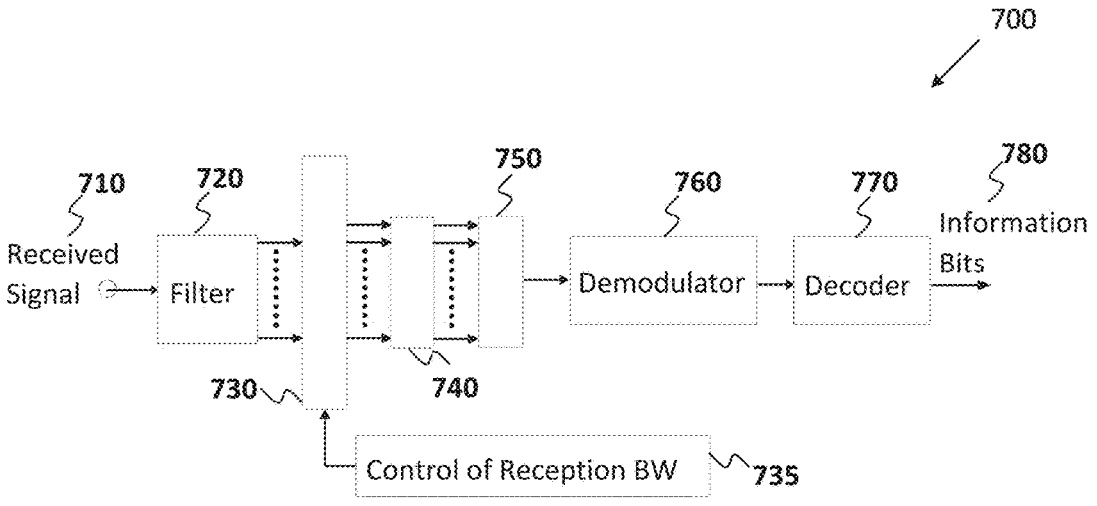
FIG. 7 illustrates an example of a receiver structure for PDSCH in a subframe according to embodiments of the present disclosure.

FIG. 7 illustrates an example of a receiver structure 700 for PDSCH in a subframe according to embodiments of the present disclosure. For example, receiver structure 700 can be implemented by the UE 116 of FIG. 3. This example is for illustration only and other embodiments can be used without departing from the scope of the present disclosure.

With reference to FIG. 7, a received signal 710 is filtered by filter 720, REs 730 for an assigned reception BW are selected by BW selector 735, unit 740 applies a Fast Fourier Transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
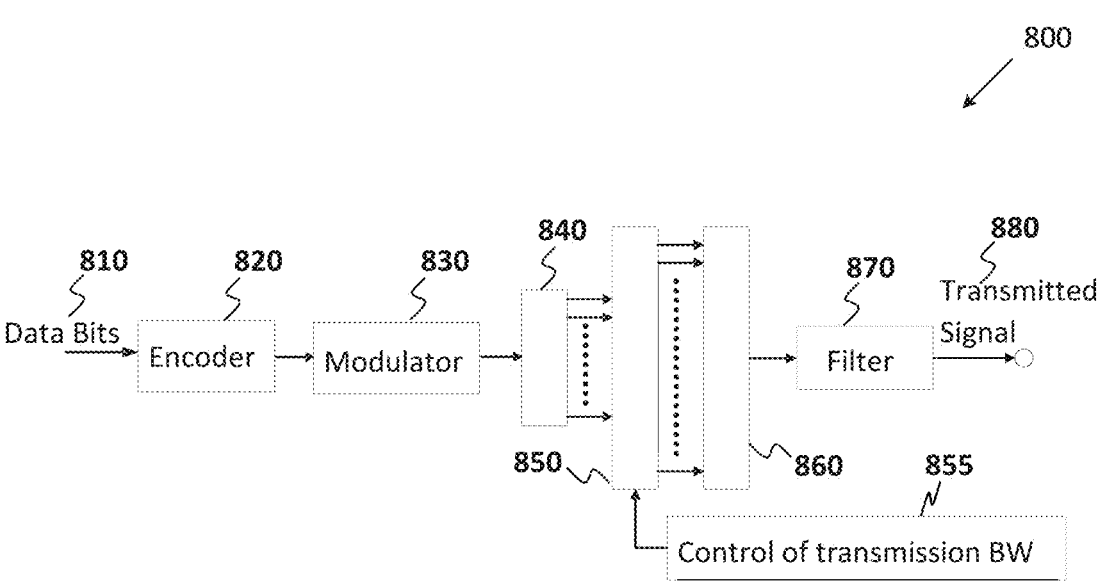
FIG. 8 illustrates an example of a transmitter structure for physical uplink shared channel (PUSCH) in a subframe according to embodiments of the present disclosure.

FIG. 8 illustrates an example of a transmitter structure 800 for PUSCH in a subframe according to embodiments of the present disclosure. For example, transmitter structure 800 can be implemented in gNB 102 of FIG. 1. This example is for illustration only and other embodiments can be used without departing from the scope of the present disclosure.

As illustrated in FIG. 8, information data bits 810 are encoded by encoder 820, such as a turbo encoder, and modulated by modulator 830. A Discrete Fourier Transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
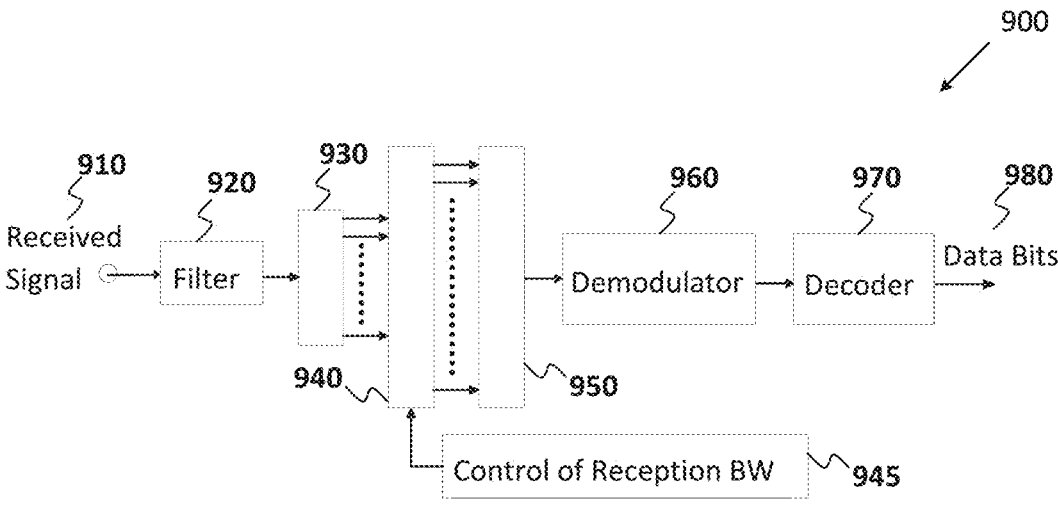
FIG. 9 illustrates an example of a receiver structure for a PUSCH in a subframe according to embodiments of the present disclosure.

FIG. 9 illustrates an example of a receiver structure 900 for a PUSCH in a subframe according to embodiments of the present disclosure; For example, receiver structure 900 can be implemented by the UE 116 of FIG. 3. This example is for illustration only and other embodiments can be used without departing from the scope of the present disclosure.

As illustrated in FIG. 9, a received signal 910 is filtered by filter 920. Subsequently, after a cyclic prefix is removed (not shown), unit 930 applies a FFT, REs 940 corresponding to an assigned PUSCH reception BW are selected by a reception BW selector 945, unit 950 applies an Inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

There are two types of frequency range (FR) defined in 3GPP 5G NR specifications. The sub-6 GHz range is called frequency range 1 (FR1) and millimeter wave range is called frequency range 2 (FR2). An example of the frequency range for FR1 and FR2 is shown herein.

| Frequency range designation | Corresponding frequency range |
|---|---|
| FR1 | 450 MHz-6000 MHz |
| FR2 | 24250 MHz-52600 MHz |

For MIMO in FR1, up to 32 CSI-RS antenna ports is supported, and in FR2, up to 8 CSI-RS antenna ports is supported. In next generation cellular standards (e.g., 6G), in addition to FR1 and FR2, new carrier frequency bands can be regarded, e.g., FR4 (>52.6 GHz), terahertz (>100 GHz) and upper mid-band (10-15 GHz). The number of CSI-RS ports that can be supported for these new bands is likely to be different from FR1 and FR2. In particular, for 10-15 GHz band, the max number of CSI-RS antenna ports is likely to be more than FR1 due to smaller antenna form factors and feasibility of fully digital beamforming (as in FR1) at these frequencies. For instance, the number of CSI-RS antenna ports can grow up to 128. Besides, the NW deployment/topology at these frequencies is also expected to be denser/distributed. For example, antenna ports distributed at multiple (potentially non-co-located, hence geographically separated) TRPs within a cellular region can be the main scenario of interest due to which the number of CSI-RS antenna ports for MIMO can be even larger (e.g., up to 256).

A (spatial or digital) precoding/beamforming can be used across these large number of antenna ports in order to achieve MIMO gains. Depending on the carrier frequency and the feasibility of radio frequency (RF)/hardware (HW)-related components, the (spatial) precoding/beamforming can be fully digital or hybrid analog-digital. In fully digital beamforming there can be one-to-one mapping between an antenna port and an antenna element or a 'static/fixed' virtualization of multiple antenna elements to one antenna port can be used. Each antenna port can be digitally controlled. Hence, a spatial multiplexing across each antenna port is possible.

In a wireless communication system, MIMO is often identified as an essential feature in order to achieve high system throughput requirements. One of the key components of a MIMO transmission scheme is the accurate CSI acquisition at the eNB (or gNB) (or TRP). Embodiments of the present disclosure recognize for multi-user MIMO (MU-MIMO), in particular, the availability of accurate CSI is necessary in order to guarantee high MU performance. For time division duplexing (TDD) systems, the CSI can be acquired using the SRS transmission relying on the channel reciprocity. For frequency division duplexing (FDD) systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems (document and standard [7], document and standard [8]), the "implicit" CSI reporting paradigm mentioned herein from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in document and standard [8]). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising each component) demands to be reported by the UE 116. However, when reciprocity or partial reciprocity does exist between UL and DL, then some of the CSI components can be obtained based on the UL channel estimated using SRS transmission from the UE 116. In Rel. 16 NR, the DFT-based FD compression is extended to this partial reciprocity case (referred to as Rel. 16 enhanced Type II port selection codebook in document and standard [8]), wherein the DFT-based SD basis in $W_1$ is replaced with SD CSI-RS port selection, i.e., L out of $$\frac{P_{CSI-RS}}{2}$$

ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD or/and M ports are selected in FD. The CSI-RS ports in this case are beamformed in SD (assuming UL-DL channel reciprocity in angular domain) or/and FD (assuming UL-DL channel reciprocity in delay/frequency domain), and the corresponding SD or/and FD beamforming information can be obtained at the gNB based on UL channel estimated using SRS measurements. In Rel. 17, such a codebook is supported (which is referred to as Rel. 17 further enhanced Type II port selection codebook in document and standard [8]).

Non-coherent joint transmission (NCJT) CSI reporting: When the UE 116 can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting assume a NCJT, i.e., a layer (and precoder) of the transmission is restricted to be transmitted from only one TRP.

In Rel. 18 NR MIMO, the following CSI enhancements are further viewed targeting two use cases (coherent joint transmission from multiple TRPs, and high/medium velocity UEs):

Enhancements of CSI acquisition for Coherent-JT targeting FR1 and up to 4 TRPs, assuming ideal backhaul and synchronization as well as the same number of antenna ports across TRPs, as follows:

Rel-16/17 Type-II codebook refinement for CJT mTRP targeting FDD and its associated CSI reporting, taking into account throughput-overhead trade-off CSI reporting enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis.

UE reporting of time-domain channel properties measured via CSI-RS for tracking.

In next generation MIMO systems, the number of antenna ports is expected to increase further (e.g., up to 256), for example, for carrier frequencies in upper mid-band (10-15 GHz); the NW deployments are likely to be denser/more distributed (when compared with 5G NR); and the system is expected to work seamlessly even in challenging scenarios such as medium-high (e.g. 120 kmph) speed UEs, 'higher-order' multi-user MIMO. The CSI in such systems may demand to be high resolution (higher than Type II CSI in 5G NR) while keeping the UE 116 complexity (associated with CSI calculation) and CSI overhead (number of bits to report the CSI) still manageable (e.g., similar to that for 5G NR Type II CSI). The present disclosure provides a CSI framework and components tailored towards acquiring such CSI.

The present disclosure relates to a CSI reporting framework in MIMO communication systems. In particular, it relates to the CSI reporting based on a high-resolution (or Type II) codebook comprising spatial-, frequency- and time-(Doppler-) domain components for a distributed antenna structure (DMIMO). The CSI reporting framework is designed to work in scenarios such as medium-high (e.g. 120 kmph), while keeping the UE complexity and CSI overhead at manageable levels. The features of the proposed framework are as follows:

CSI framework comprising basis (W1) and combining coefficients (W2), where W1 is codebook-based, and W2 is convolutional-based (may call for training, e.g., via artificial intelligence (AI)/machine learning (ML) approach).

Basis include set of basis entities such as vectors and matrices, where basis entities are dimensionalized based on SD (antenna ports), FD, and DD/TD units.

Separate or joint basis entity across at least 2 of SD, FD, and/or DD/TD.

Examples of basis types.

Aspects, features, and advantages of the present disclosure are readily apparent from the following detailed description simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. Embodiments of the present disclosure are illustrated by way of example, and not by way of limitation, in the figures of the accompanying drawings.

In the following, for brevity, both FDD and TDD are regarded as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction, in combination with one another, or can operate as standalone schemes.

Each of the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, each of the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include each of the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" or bandwidth part (BWP) can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz large system bandwidth may call for multiple CSI reporting bands. The value of n can either be configured semi-statically (via higher-layer signaling or RRC) or dynamically (via MAC CE or L1 DL control signaling). Alternatively, the UE 116 can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for each of the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 10:
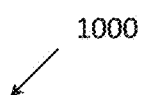
FIG. 10 illustrates a diagram of an antenna port layout according to embodiments of the present disclosure.
Figure 10:
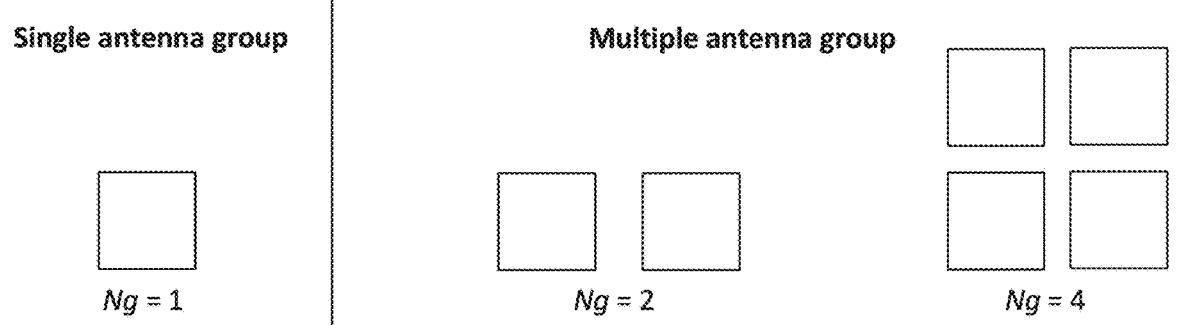

FIG. 10 illustrates a diagram 1000 of an antenna port layout according to embodiments of the present disclosure. For example, diagram 1000 of an antenna port layout can be implemented by the BS 102 of FIG. 1. This example is for illustration only and can be used without departing from the scope of the present disclosure.

With reference to FIG. 10, we assume that $N_1$ and $N_2$ are the number of antenna ports with the same polarization in the first and second dimensions, respectively. For 2D antenna port layouts, we have $N_1>1$, $N_2>1$, and for 1D antenna port layouts $N_1>1$ and $N_2=1$ (or $N_1=1$ and $N_2>1$). For a single-polarized (or co-polarized) antenna port layout, the total number of antenna ports is $P_{CSIRS}=N_1N_2$. For a dual-polarized antenna port layout, the total number of antenna ports is $P_{CSIRS}=2N_1N_2$. "X" represents two antenna polarizations. In the present disclosure, the term "polarization" refers to a group of antenna ports with the same polarization. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g. X=3000, then antenna ports are 3000, 3001, 3002, . . . ). Dual-polarized antenna payouts are assumed in the present disclosure. However, the embodiments (and examples) in the present disclosure are general and are applicable to single-polarized antenna layouts as well.

Let $N_g$ be a number of AGs. When there are multiple antenna groups ($N_g>1$), we assume that each group (g∈ {1, . . . , $N_g$}) comprises dual-polarized antenna ports with $N_{1,g}$ and $N_{2,g}$ ports in two dimensions. Note that the antenna port layouts may be the same ($N_{1,g}=N_1$ and $N_{2,g}=N_2$) in different antenna groups, or they can be different across antenna groups. For group g, the number of antenna ports is $P_{CSIRS,g}=N_{1,g}N_{2,g}$ or $2N_{1,g}N_{2,g}$ (for co-polarized or dual-polarized respectively).

In one example, an antenna group corresponds to an antenna panel. In one example, an antenna group corresponds to a TRP. In one example, an antenna group corresponds to a remote radio head (RRH). In one example, an antenna group corresponds to CSI-RS antenna ports of a non-zero-power (NZP) CSI-RS resource. In one example, an antenna group corresponds to a subset of CSI-RS antenna ports of a NZP CSI-RS resource (comprising multiple antenna groups). In one example, an antenna group corresponds to CSI-RS antenna ports of multiple NZP CSI-RS resources (e.g., comprising a CSI-RS resource set).

In one example, an antenna group corresponds to a reconfigurable intelligent surface (RIS) in which the antenna group can be (re-)configured more dynamically (e.g., via MAC CE or/and DCI). For example, the number of antenna ports associated with the antenna group can be changed dynamically.

Figure 11:
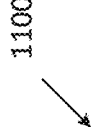
FIG. 11 illustrates an example of a UE moving on a trajectory located in co-located and distributed antenna groups (AGs) according to embodiments of the present disclosure.
Figure 11:
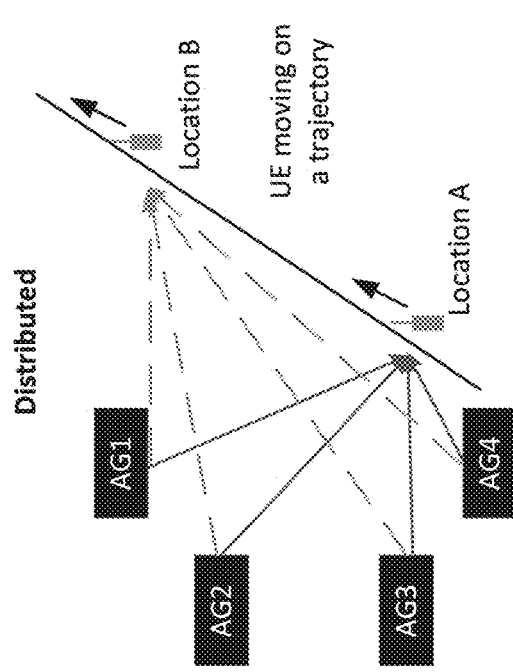
Figure 11:
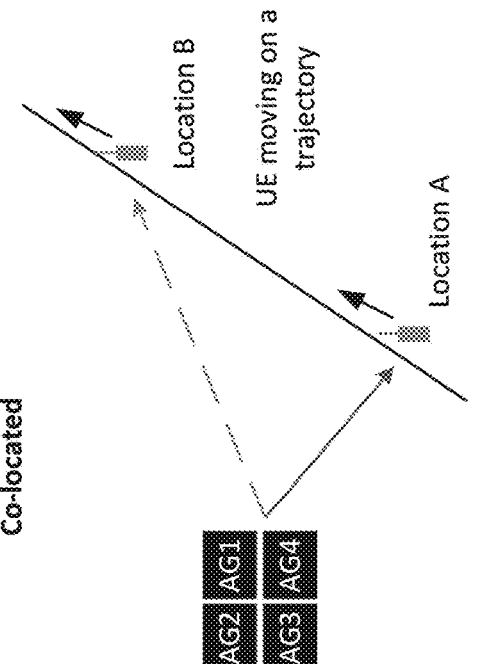

FIG. 11 illustrates an example of a UE moving on a trajectory 1100 located in co-located and distributed AGs according to embodiments of the present disclosure. For example, trajectory 1100 located in co-located and distributed AGs can be implemented by the UE 116 of FIG. 3. This example is for illustration only and can be used without departing from the scope of the present disclosure.

In one example scenario, multiple AGs can be co-located or distributed, and can serve static (non-mobile) or moving UEs. While the UE 116 moves from a location A to another location B, the UE 116 measures the channel, e.g., via NZP CSI-RS resources, (may also measure the interference, e.g., via CSI interference measurement (CSI-IM) resources or CSI-RS resources for interference measurement) and uses the measurement to determine/report CSI evaluating joint transmission from multiple AGs. The reported CSI can be based on a codebook. The codebook can include components evaluating multiple AGs, and frequency/delay-domain channel profile and time/Doppler-domain channel profile.

In one example, the antenna architecture of the MIMO system is structured. For example, the antenna structure at each AG is dual-polarized (single or multi-panel as shown in FIG. 11). The antenna structure at each AG can be the same. Or the antenna structure at an AG can be different from another AG. Likewise, the number of ports at each AG can be the same. Or the number of ports at one AG can be different from another AG.

In another example, the antenna architecture of the MIMO system is unstructured. For example, the antenna structure at one AG can be different from another AG.

We assume a structured antenna architecture in the rest of the present disclosure. For simplicity, we assume each AG is equivalent to a panel although an AG can have multiple panels in practice. However, the present disclosure is not restrictive to a single panel assumption at each AG and can easily be extended (covers) the case when an AG has multiple antenna panels.

In another embodiment, an AG constitutes (or corresponds to or is equivalent to) at least one of the following:

In one example, an AG corresponds to a TRP.

In one example, an AG corresponds to a CSI-RS resource. A UE is configured with $K=N_g>1$ non-zero-power (NZP) CSI-RS resources and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained in the present disclosure.

In one example, an AG corresponds to a CSI-RS resource group, where a group comprises one or multiple NZP CSI-RS resources. A UE is configured with $K \geq N_g>1$ non-zero-power (NZP) CSI-RS resources and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained in the present disclosure. In particular, the K CSI-RS resources can be partitioned into $N_g$ resource groups. The information about the resource grouping can be provided together with the CSI-RS resource setting/configuration, or with the CSI reporting setting/configuration, or with the CSI-RS resource configuration.

In one example, an AG corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an AG. The information about the subsets of ports or grouping of ports can be provided together with the CSI-RS resource setting/configuration, or with the CSI reporting setting/configuration, or with the CSI-RS resource configuration.

In one example, an AG corresponds to one or more examples described herein depending on a configuration. For example, this configuration can be explicit via a parameter (e.g., an RRC parameter). Or it can be implicit.

In one example, when implicit, it could be based on the value of K. For example, when K>1 CSI-RS resources, an AG corresponds to one or more examples described herein, and when K=1 CSI-RS resource, an AG corresponds to one or more examples described herein.

In another example, the configuration could be based on the configured codebook. For example, an AG corresponds to a CSI-RS resource or resource group when the codebook corresponds to a decoupled codebook (modular or separate codebook for each AG). An AG corresponds to a subset (or a group) of CSI-RS ports when codebook corresponds to a coupled (joint or coherent) codebook (one joint codebook across AGs).

In one example, when AG maps (or corresponds to) a CSI-RS resource or resource group, and a UE can select a subset of AGs (resources or resource groups) and report the CSI for the selected AGs (resources or resource groups), the selected AGs can be reported via an indicator. For example, the indicator can be a CRI or a PMI (component) or a new indicator.

In one example, when AG maps (or corresponds to) a CSI-RS port group, and a UE can select a subset of AGs (port groups) and report the CSI for the selected AGs (port groups), the selected AGs can be reported via an indicator. For example, the indicator can be a CRI or a PMI (component) or a new indicator.

In one example, when multiple (K>1) CSI-RS resources are configured for $N_g$ AGs, a decoupled (modular) codebook is used/configured, and when a single (K=1) CSI-RS resource for $N_g$ AGs, a joint codebook is used/configured.

Figure 12:
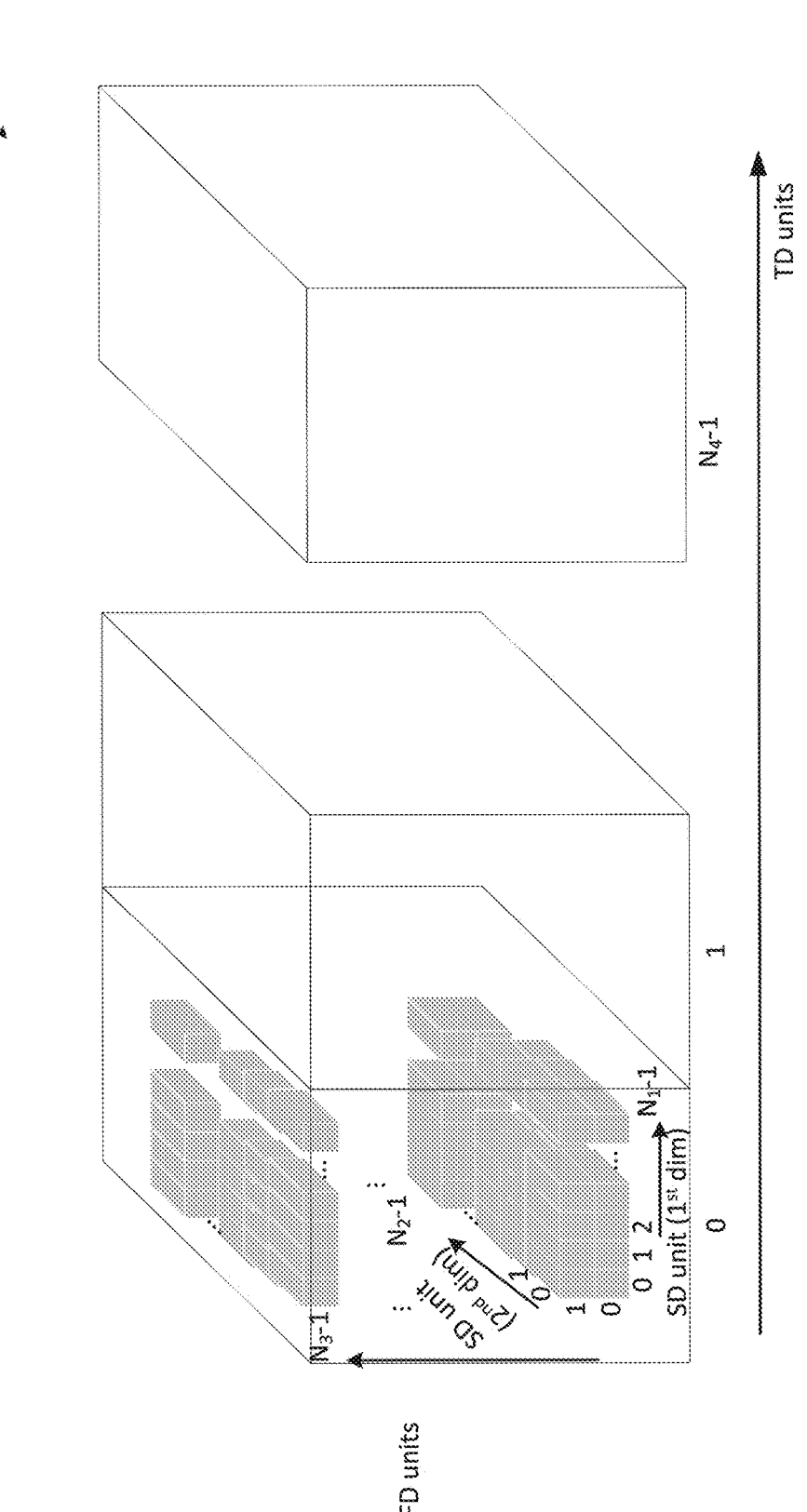
FIG. 12 illustrates a diagram of spatial-domain (SD) units in $1^{st}$ and $2^{nd}$ antenna dimensions, frequency-domain (FD) units, and time-domain (TD) units according to embodiments of the present disclosure.

FIG. 12 illustrates a diagram 1200 of SD units in $1^{st}$ and $2^{nd}$ antenna dimensions, FD units, and TD units according to embodiments of the present disclosure. For example, diagram 1200 of SD units in $1^{st}$ and $2^{nd}$ antenna dimensions, FD units, and TD units can be utilized by any of the UEs 111-116 of FIG. 1. This example is for illustration only and can be used without departing from the scope of the present disclosure.

In one embodiment, a UE is configured (e.g., via a higher layer CSI configuration information) with a CSI report, where the CSI report is based on a channel measurement (and interference measurement) and a codebook. When the CSI report is configured to be aperiodic, it is reported when triggered via a DCI field (e.g., a CSI request field) in a DCI.

The channel measurement can be based on K≥1 channel measurement resources (CMRs) that are transmitted from a plurality of spatial-domain (SD) units (e.g., a SD unit=a CSI-RS antenna port) and are measured via a plurality of frequency-domain (FD) units (e.g. a FD unit=one or more PRBs/subbands (SBs)) via either a time-domain (TD) unit or a plurality of TD units (e.g. a TD unit=one or more time slots). In one example, a CMR can be a NZP-CSI-RS resource.

The CSI report can be associated with the plurality of FD units and the plurality of TD units associated with the channel measurement. Alternatively, the CSI report can be associated with a second set of FD units (different from the plurality of FD units associated with the channel measurement) or/and a second set of TD units (different from the plurality of TD units associated with the channel measurement). In this later case, the UE 116, based on the channel measurement, can perform prediction (interpolation or extrapolation) in the second set of FD units or/and the second set of TD units associated with the CSI report.

The first dimension is associated with the 1st antenna port dimension and comprises $N_1$ units. The second dimension is associated with the 2nd antenna port dimension and comprises $N_2$ units. The third dimension is associated with frequency dimension and comprises $N_3$ units. The fourth dimension is associated with the time/Doppler dimension and comprises $N_4$ units.

The plurality of SD units can be associated with antenna ports (e.g., co-located at one site or distributed across multiple sites) comprising one or multiple antenna groups (i.e., $N_g \geq 1$), and dimensionalizes the spatial-domain profile of the channel measurement.

When K=1, there is one CMR comprising $P_{CSIRS}$ CSI-RS antenna ports.

When $N_g$=1, there is one AG comprising each of the $P_{CSIRS}$ ports, and the CSI report is based on the channel measurement from the one AG.

When $N_g$>1, there are multiple AGs, and the CSI report is based on the channel measurement from/across the multiple AGs.

When K>1, there are multiple CMRs, and the CSI report is based on the channel measurement across the multiple CMRs. In one example, a CMR corresponds to an AG (one-to-one mapping). In one example, multiple CMRs can correspond to an AG (many-to-one mapping).

In one example, when each of the $P_{CSIRS}$ antenna ports are co-located at one site, $N_g$=1. In one example, when each of the $P_{CSIRS}$ antenna ports are distributed (non-co-located) across multiple sites, $N_g$>1.

In one example, when each of the $P_{CSIRS}$ antenna ports are co-located at one site and within a single antenna panel, $N_g$=1. In one example, when each of the $P_{CSIRS}$ antenna ports are distributed across multiple antenna panels (can be co-located or non-co-located), $N_g$>1.

The value of $N_g$ can be configured, e.g., via higher layer RRC parameter. Or it can be indicated via a MAC CE. Or it can be provided via a DCI field.

Likewise, the value of K can be configured, e.g., via higher layer RRC parameter. Or it can be indicated via a MAC CE. Or it can be provided via a DCI field.

In one example, K=$N_g$=X. The value of X can be configured, e.g., via higher layer RRC parameter. Or it can be indicated via a MAC CE. Or it can be provided via a DCI field.

In one example, the value of K is determined based on the value of $N_g$. In one example, the value of $N_g$ is determined based on the value of K.

The plurality of FD units can be associated with a frequency domain allocation of resources (e.g., one or multiple CSI reporting bands, each comprising multiple PRBs) and dimensionalizes the frequency (or delay)-domain profile of the channel measurement.

The plurality of TD units can be associated with a time domain allocation of resources (e.g., one or multiple CSI reporting windows, each comprising multiple time slots) and dimensionalizes the time (or Doppler)-domain profile of the channel measurement.

Figure 13:
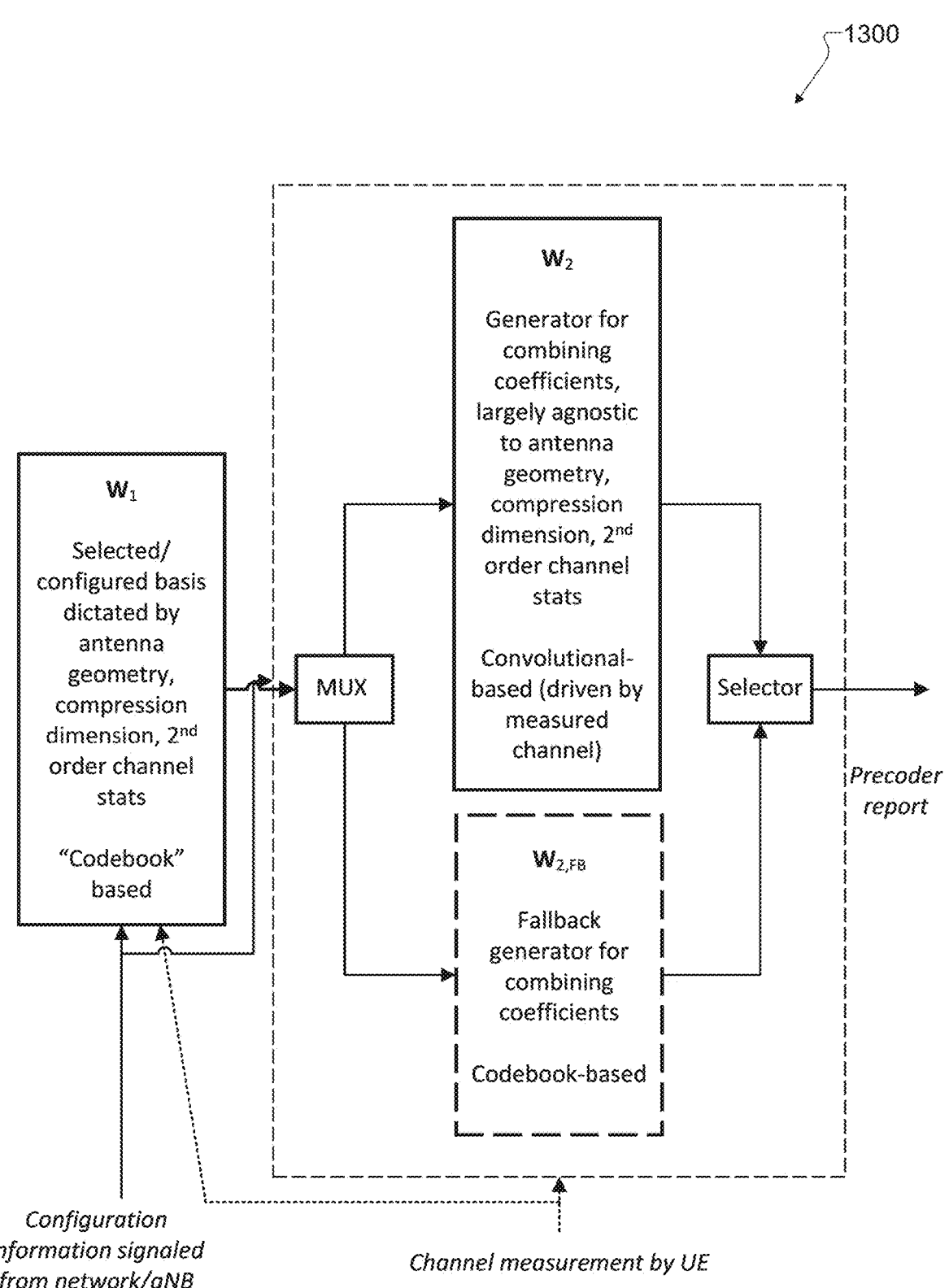
FIG. 13 illustrates a diagram of components for precoding matrix information reporting according to embodiments of the present disclosure.

FIG. 13 illustrates a diagram 1300 of precoding matrix information components for CSI reporting according to embodiments of the present disclosure. For example, diagram 1300 of precoding matrix information components for CSI reporting may be utilized by the UE 116 of FIG. 3. This example is for illustration only and can be used without departing from the scope of the present disclosure.

The CSI report includes an information about a precoding matrix (e.g., the information is an indicator such as PMI). The information about the precoding matrix comprises/includes at least two components ($W_1$ and $W_2$). The first component ($W_1$) includes a basis which corresponds to a set of basis entities. The second component ($W_2$) includes combining coefficients which linearly combine the basis entities, i.e., the precoding matrix can be represented as a weighted summation over the basis entities, where the weights are the combining coefficients.

The first component $W_1$ is codebook-based. When the basis demands reporting (or configured to be reported), the codebook configured for the CSI report includes at least one component for reporting the basis $W_1$. This component is similar to legacy (e.g., Type I and II codebooks in 5G NR) codebooks. However, since $W_1$ is decoupled from $W_2$, the framework allows more options and parameterization for the $W_1$ basis as future upgrades when newer antenna types become available.

The second component ($W_2$) on the other hand is convolutional-based and is driven/trained/derived based on the channel measurement. For instance, the channel measurement can be projected on to the basis $W_1$ and projected channel can be used to derive the $W_2$ combining coefficients based on a ML or AI approach which is agnostic to antenna structure/geometry/dimension, implying there may be no (or less) demand for upgrades for more futuristic scenarios. The convolutional-based $W_2$ is expected to achieve higher resolution (than for example, Type II codebooks in 5G NR), with less decoding complexity. Such an approach may call for a mechanism to train/adapt the $W_2$ coefficients (albeit less often), which can be facilitated by having a codebook-based $W_2$ also. This can be based on Type I or Type II codebooks in 5G NR and can also serve as a fallback to the legacy (codebook-based) $W_2$ coefficients. This fallback component is denoted as $W_{2,FB}$ and the codebook configured for the CSI report includes at least one component for reporting $W_{2,FB}$.

In one example, the CSI report is based on the convolutional-based $W_2$ unless configured otherwise (i.e., the UE 116 is configured to use $W_{2,FB}$ or $W_{2,FB}$ is enabled). In one example, the UE 116 is configured with one of $W_2$ and $W_{2,FB}$ for the CSI report (e.g., via RRC or/and MAC CE or/and DCI). In one example, the baseline for the CSI report is $W_{2,FB}$ (i.e., the UE 116 is mandated to support it), and the support of $W_2$ is optional (i.e., subject to UE capability). When the UE 116 reports being capable of supporting $W_2$, then only the UE 116 can be configured with the CSI report based on $W_2$.

The basis can be selected by the UE 116 (hence reported, e.g., via the CSI report) or configured by the NW 130. When configured, the UE 116 can use the configured basis to derive the CSI report or use the configured basis to determine the basis for reporting. For example, the configured basis can be included an intermediate set of basis entities and the UE 116 uses this intermediate set to determine the basis for reporting. In one example, the intermediate set corresponds to a window of (consecutive) basis entities.

In one embodiment, the basis can be dictated by (or associated with) at least one of the spatial-domain profile, frequency (or delay)-domain profile, or time (Doppler)-domain profile of the channel measurement. Even though the number of CSI-RS antenna ports can be large (e.g. 256), the antenna ports are expected to have some antenna structure (e.g. similar to 2D active antenna array), hence the SD channel profile can be represented using SD basis entities, where the SD basis entities have dimension depending on the number of SD units ($P_{CSIRS}$ or $$\frac{P_{CSIRS}}{2}$$

or $2N_1N_2$ or $N_1N_2$). Likewise, the FD channel profile is likely to be correlated across FD units and the DD/TD channel profile is also expected to have some correlation across DD/TD units (e.g., for low-medium speed UEs).

Hence, FD and DD/TD channel profiles can be represented using FD and DD/TD basis entities, respectively, where their dimensions depend on the number of FD units ($N_3$) and the number of DD/TD units ($N_4$), respectively.

In one example, a basis entity is a vector, hence the basis comprises a set of vectors.

In one example, a basis entity is across SD units and corresponds to a SD vector of size X×1. That is, there is no basis across FD or DD/TD units. Or, the basis across FD units can be fixed (e.g. to 1 or an all-one vector of length $N_3$ or a length-$N_3$ DFT vector with index 0 or an identity matrix of size $N_3 \times N_3$) and, likewise, the basis across DD/TD units can be fixed (e.g. to 1 or an all-one vector of length $N_4$ or a length-$N_4$ DFT vector with index 0 or an identity matrix of size $N_4 \times N_4$).

In one example, $X = P_{CSIRS}$ or $X = 2N_1N_2$. $W_1 = [b^{(0)} \ldots b^{(L-1)}]$ where $b^{(i)}$ is a SD vector, i=0, ..., L−1, and L is the number of SD vectors comprising the basis.

In one example, $$X = \frac{P_{CSIRS}}{2}$$

or $$X = N_1N_2.$$

$$W_1 = \begin{bmatrix} B_1 & 0 \\ 0 & B_2 \end{bmatrix}$$

-continued where $$B_r = \begin{bmatrix} b_r^{(0)} & \ldots & b_r^{(L-1)} \end{bmatrix},$$

$$b_r^{(i)}$$

is a SD vector, r=0,1 is a polarization index, i=0, ..., L−1 is a SD vector index, and L is the number of SD vectors comprising the basis.

In one example, the basis is polarization-common, i.e., the same for both polarizations ($B_1 = B_2 = B$).

In one example, the basis is polarization-specific, i.e., two independent bases, one for each polarization.

In one example, when $N_g > 1$, the SD basis (denoted as $W_{1,g}$) is the same/common across AGs, where the common SD basis is according to one or more examples described herein. That is, $W_{1,g} = W_1$ for each g=0, ..., $N_g - 1$. The overall basis is given by a block diagonal matrix $$\begin{bmatrix} W_1 & 0 & 0 \\ 0 & \ddots & 0 \\ 0 & 0 & W_1 \end{bmatrix}.$$

In one example, when $N_g > 1$, the SD basis can be different/independent for each AG, where the SD basis for each AG is according to one or more examples described herein. The overall basis is given by a block diagonal matrix $$\begin{bmatrix} W_{1,0} & 0 & 0 \\ 0 & \ddots & 0 \\ 0 & 0 & W_{1,N_g-1} \end{bmatrix}.$$

In one example, the UE 116 is configured with a type of $W_1$, where the type can be one or more examples described herein. The configuration of the type can be subject to a UE capability information reported by the UE 116.

In one example, a basis entity is across SD and FD units and corresponds to a vector that is a Kronecker product of two separate/independent vectors ($b^{(i)}$ of length X and $y^{(f)}$ of length $N_3$), one for SD and one for FD. When $$b^{(i)} = \begin{bmatrix} b_0^{(i)}, b_1^{(i)}, \ldots, b_{X-1}^{(i)} \end{bmatrix} \text{ and } y^{(f)} = \begin{bmatrix} y_0^{(f)}, \ldots, y_{N_3-1}^{(f)} \end{bmatrix},$$

their Kronecker product is a vector given by $c^{(i,f)}$ or $c^{(f,i)}$, where $$c^{(i,f)} = \left( b^{(i)} \otimes y^{(f)} \right)^T = \begin{bmatrix} b_0^{(i)} y^{(f)}, b_1^{(i)} y^{(f)}, \ldots, b_{X-1}^{(i)} y^{(f)} \end{bmatrix}^T =$$
$$\begin{bmatrix} b_0^{(i)} y_0^{(f)}, \ldots, b_0^{(i)} y_{N_3-1}^{(f)}, b_1^{(i)} y_0^{(f)}, \ldots, b_1^{(i)} y_{N_3-1}^{(f)}, \ldots, b_{X-1}^{(i)} y_0^{(f)}, \ldots, b_{X-1}^{(i)} y_{N_3-1}^{(f)} \end{bmatrix}^T, \text{ and}$$
$$c^{(f,i)} = \left( y^{(f)} \otimes b^{(i)} \right)^T =$$
$$\begin{bmatrix} b_0^{(i)} y_0^{(f)}, \ldots, b_{X-1}^{(i)} y_0^{(f)}, b_0^{(i)} y_1^{(f)}, \ldots, b_{X-1}^{(i)} y_1^{(f)}, \ldots, b_0^{(i)} y_{N_3-1}^{(f)}, \ldots, b_{X-1}^{(i)} y_{N_3-1}^{(f)} \end{bmatrix}^T.$$

There may not be a basis across DD/TD units. Or the basis across DD/TD units can be fixed (e.g., to 1 or an all-one vector of length $N_4$ or a length-$N_4$ DFT vector with index 0 or an identity matrix of size $N_4 \times N_4$).

In one example, the basis is determined based on two separate sets, a first set for L SD basis vectors {$b^{(i)}$: i=0, ..., L−1} and a second set for M FD basis vectors {$y^{(f)}$:f=0, ..., M−1}. The number of Kronecker product vectors is LM.

When $b^{(i)}$ is according to one or more examples described herein, $$W_1 = [c^{(0,0)} \ldots c^{(0,\beta-1)}, c^{(1,0)} \ldots c^{(1,\beta-1)}, \ldots, c^{(\alpha-1,0)} \ldots c^{(\alpha-1,\beta-1)}]$$

When $b^{(i)}$ is according to one or more examples described herein, $$W_1 = \begin{bmatrix} \begin{matrix} c^{(0,0)} & \ldots & c^{(0,\beta-1)}, \\ c^{(1,0)} & \ldots & c^{(1,\beta-1)}, \ldots, \\ c^{(\alpha-1,0)} & \ldots & c^{(\alpha-1,\beta-1)} \end{matrix} & 0 \\ 0 & \begin{matrix} c^{(0,0)} & \ldots & c^{(0,\beta-1)}, \\ c^{(1,0)} & \ldots & c^{(1,\beta-1)}, \ldots, \\ c^{(\alpha-1,0)} & \ldots & c^{(\alpha-1,\beta-1)} \end{matrix} \end{bmatrix}$$

Here, $(\alpha,\beta)=(L,M)$ or $(M,L)$.

In one example, the basis is determined based on one set comprising L pairs of (SD,FD) vectors $\{(b^{i,k}, y^{(f_k)}): k=0, \ldots, L-1\}$.

When $b^{(i)}$ is according to one or more examples described herein, $$W_1 = [c^{(\alpha_0, \beta_0)}, c^{(\alpha_1, \beta_1)}, \ldots, c^{(\alpha_{L-1}, \beta_{L-1})}]$$

When $b^{(i)}$ is according to one or more examples described herein, $$W_1 = \begin{bmatrix} c^{(\alpha_0, \beta_0)}, c^{(\alpha_1, \beta_1)}, & 0 \\ \ldots, c^{(\alpha_{L-1}, \beta_{L-1})} & \\ & c^{(\alpha_0, \beta_0)}, c^{(\alpha_1, \beta_1)}, \\ 0 & \ldots, c^{(\alpha_{L-1}, \beta_{L-1})} \end{bmatrix}$$

Here, $(\alpha, \beta) = (i, f)$ or $(f, i)$.

In one example, a basis entity is across SD and FD units and corresponds to a joint vector across SD and FD and a size $XN_3 \times 1$. In one example, the joint vectors are used to represent joint SD-FD Eigenvectors ($e_i$) of the channel H in which the SD and FD are concatenated together as one dimension. For example, when H is a $XN_3 \times N_r$ matrix, where $N_r$ is the number of antenna at the UE 116, then $e_i$ is an eigenvector of HH*.

There may not be a basis across DD/TD units. Or the basis across DD/TD units can be fixed (e.g., to 1 or an all-one vector of length $N_4$ or a length-$N_4$ DFT vector with index 0 or an identity matrix of size $N_4 \times N_4$).

In one example, the basis entity is across SD and DD units and corresponds to a vector that is a Kronecker product of two separate/independent vectors ($b^{(i)}$ of length X and $z^{(t)}$ of length $N_4$), one for SD and one for DD. When $$b^{(i)} = [b_0^{(i)}, b_1^{(i)}, \ldots, b_{X-1}^{(i)}] \text{ and } z^{(t)} = [z_0^{(t)}, \ldots, z_{N_4-1}^{(t)}],$$

their Kronecker product is a vector given by $d^{(i,t)}$ or $d^{(t,i)}$, where $$d^{(i,t)} = (b^{(i)} \otimes z^{(t)})^T = [b_0^{(i)} z^{(t)}, b_1^{(i)} z^{(t)}, \ldots, b_{X-1}^{(i)} z^{(t)}]^T =$$
$$[b_0^{(i)} z_0^{(t)}, \ldots, b_0^{(i)} z_{N_4-1}^{(t)}, b_1^{(i)} z_0^{(t)}, \ldots, b_1^{(i)} z_{N_4-1}^{(t)}, \ldots, b_{X-1}^{(i)} z_0^{(t)}, \ldots, b_{X-1}^{(i)} z_{N_4-1}^{(t)}]^T,$$

and $$d^{(t,i)} = (z^{(t)} \otimes b^{(i)})^T =$$
$$[b_0^{(i)} z_0^{(t)}, \ldots, b_{X-1}^{(i)} z_0^{(t)}, b_0^{(i)} z_1^{(t)}, \ldots, b_{X-1}^{(i)} z_1^{(t)}, \ldots, b_0^{(i)} z_{N_4-1}^{(t)}, \ldots, b_{X-1}^{(i)} z_{N_4-1}^{(t)}]^T.$$

There may not be a basis across FD units. Or the basis across FD units can be fixed (e.g., to 1 or an all-one vector of length $N_3$ or a length-$N_3$ DFT vector with index 0 or an identity matrix of size $N_3 \times N_3$).

In one example, the basis is determined based on two separate sets, a first set for L SD basis vectors $\{b^{(i)}: i=0, \ldots, L-1\}$ and a second set for Q DD/TD basis vectors $\{z^{(t)}: t=0, \ldots, Q-1\}$. The number of Kronecker product vectors is LQ.

When $b^{(i)}$ is according to one or more examples described herein, $$W_1 = [d^{(0,0)}, \ldots, d^{(0,\beta-1)}, d^{(1,0)}, \ldots, d^{(1,\beta-1)}, \ldots, d^{(\alpha-1,0)}, \ldots, d^{(\alpha-1,\beta-1)}]$$

When $b^{(i)}$ is according to one or more examples described herein, $$W_1 = \begin{bmatrix} d^{(0,0)} \ldots d^{(0,\beta-1)}, & \\ d^{(1,0)} \ldots d^{(1,\beta-1)}, \ldots, & 0 \\ d^{(\alpha-1,0)} \ldots d^{(\alpha-1,\beta-1)} & \\ & d^{(0,0)} \ldots d^{(0,\beta-1)}, \\ 0 & d^{(1,0)} \ldots d^{(1,\beta-1)}, \ldots, \\ & d^{(\alpha-1,0)} \ldots d^{(\alpha-1,\beta-1)} \end{bmatrix}$$

Here, $(\alpha, \beta) = (L, Q)$ or $(Q, L)$.

In one example, the basis is determined based on one set comprising L pairs of (SD,DD/TD) vectors $\{(b^{i,k}, z^{(t_k)}): k=0, \ldots, L-1\}$.

When $b^{(i)}$ is according to one or more examples described herein, $$W_1 = [d^{(\alpha_0, \beta_0)}, d^{(\alpha_1, \beta_1)}, \ldots, d^{(\alpha_{L-1}, \beta_{L-1})}]$$

When $b^{(i)}$ is according to one or more examples described herein, $$W_1 = \begin{bmatrix} d^{(\alpha_0, \beta_0)}, d^{(\alpha_1, \beta_1)}, & 0 \\ \ldots, d^{(\alpha_{L-1}, \beta_{L-1})} & \\ & d^{(\alpha_0, \beta_0)}, d^{(\alpha_1, \beta_1)}, \\ 0 & \ldots, d^{(\alpha_{L-1}, \beta_{L-1})} \end{bmatrix}$$

Here, $(\alpha, \beta) = (i, t)$ or $(t, i)$.

In one example a basis entity is across SD and DD/TD units and corresponds to a joint vector across SD and DD/TD and a size $XN_4 \times 1$. In one example, the joint vectors are used to represent joint SD-DD Eigenvectors ($e_i$) of the channel H in which the SD and DD are concatenated together as one dimension. For example, when H is a $XN_4 \times N_r$ matrix, where $N_r$ is the number of antenna at the UE 116, then $e_i$ is an eigenvector of HH*.

There may not be a basis across FD units. Or the basis across FD units can be fixed (e.g., to 1 or an all-one vector of length $N_3$ or a length-$N_3$ DFT vector with index 0 or an identity matrix of size $N_3 \times N_3$).

In one example, the basis entity is across FD and DD units and corresponds to a vector that is a Kronecker product of two separate/independent vectors ($y^{(f)}$ of length $N_3$ and $z^{(t)}$ of length $N_4$), one for FD and one for DD. When $$y^{(f)} = [y_0^{(f)}, \ldots, y_{N_3-1}^{(f)}] \text{ and } z^{(t)} = [z_0^{(t)}, \ldots, z_{N_4-1}^{(t)}],$$

their Kronecker product is a vector given by $e^{(f,t)}$ or $e^{(t,f)}$, where $$e^{(f,t)} = \left(y^{(f)} \otimes z^{(t)}\right)^T = \left[y_0^{(f)} z^{(t)}, y_1^{(f)} z^{(t)}, \ldots, y_{N_3-1}^{(f)} z^{(t)}\right]^T =$$

$$\left[y_0^{(f)} z_0^{(t)}, \ldots, y_0^{(f)} z_{N_4-1}^{(t)}, y_1^{(f)} z_0^{(t)}, \ldots, y_1^{(f)} z_{N_4-1}^{(t)}, \ldots, y_{N_3-1}^{(f)} z_0^{(t)}, \ldots, y_{N_3-1}^{(f)} z_{N_4-1}^{(t)}\right]^T, \text{ and}$$

$$e^{(t,f)} = \left(z^{(t)} \otimes y^{(f)}\right)^T = \left[y_0^{(f)} z_0^{(t)}, \ldots, y_{N_3-1}^{(f)} z_0^{(t)}, y_0^{(f)} z_1^{(t)}, \ldots, y_0^{(f)} z_{N_4-1}^{(t)}, \ldots, y_{N_3-1}^{(f)} z_{N_4-1}^{(t)}\right]^T.$$

There may not be a basis across SD units. Or the basis across SD units can be fixed (e.g., to 1 or an all-one vector of length X or a length-X DFT vector with index 0 or an identity matrix of size X×X).

In one example, the basis is determined based on two separate sets, a first set for M FD basis vectors $\{y^{(f)}:$ f=0, . . . , M−1} and a second set for Q DD basis vectors $\{z^{(t)}:$ t=0, . . . , Q−1}. The number of Kronecker product vectors is MQ. The basis is then given by $$W_1 = [e^{(0,0)} \ldots e^{(0,\beta-1)}, e^{(1,0)} \ldots e^{(1,\beta-1)}, \ldots, e^{(\alpha-1,0)} \ldots e^{(\alpha-1,\beta-1)}]$$

Here, $(\alpha,\beta)=(M,Q)$ or $(Q,M)$.

In one example, the basis is determined based on one set comprising M pairs of (FD,DD) vectors $\{(y^{(f_k)}, z^{(t_k)}:$ k=0, . . . , M−1}. The basis is then given by $$W_1 = [e^{(\alpha_0,\beta_0)}, e^{\alpha_1,\beta_1)}, \ldots, e^{(\alpha_{M-1},\beta_{M-1})}]$$

Here, $(\alpha,\beta)=(f,t)$ or $(t,f)$.

In one example, the basis entity is across FD and DD units and corresponds to a joint vector across FD and DD/TD and a size $N_3 N_4 \times 1$. In one example, the joint vectors are used to represent joint FD-DD Eigenvectors ($e_i$) of the channel H in which the FD and DD are concatenated together as one dimension. For example, when H is represented as a $N_3 N_4 \times XN_r$ matrix, where $N_r$ is the number of antenna at the UE 116, then $e_i$ is an eigenvector of HH*.

There may not be a basis across SD units. Or the basis across SD units can be fixed (e.g., to 1 or an all-one vector of length X or a length-X DFT vector with index 0 or an identity matrix of size X×X).

In one example, a basis entity is across SD, FD, and DD/TD units and corresponds to a vector that is a Kronecker product of three separate/independent vectors ($b^{(i)}$ of length X, $y^{(f)}$ of length $N_3$, and $z^{(t)}$ of length $N_4$), one for SD, one for FD and one for DD/TD. When $$b^{(i)} = \left[b_0^{(i)}, b_1^{(i)}, \ldots, b_{X-1}^{(i)}\right],$$

$$y^{(f)} = \left[y_0^{(f)}, \ldots, y_{N_3-1}^{(f)}\right] \text{ and } z^{(t)} = \left[z_0^{(t)}, \ldots, z_{N_4-1}^{(t)}\right],$$

their Kronecker product is a vector given by $a^{(i,f,t)}$, where $$a^{(i,f,t)} = \left(b^{(i)} \otimes y^{(f)} \otimes z^{(t)}\right)^T = \left(c^{(i,f)} \otimes z^{(t)}\right)^T = \left[c_0^{(i,f)} z^{(t)}, c_1^{(i,f)} z^{(t)}, \ldots, c_{XN_3-1}^{(i,f)} z^{(t)}\right]^T =$$

$$\left[b_0^{(i)} y_0^{(f)} z_0^{(t)}, \ldots, b_0^{(i)} y_0^{(f)} z_{N_4-1}^{(t)}, b_0^{(i)} y_1^{(f)} z_0^{(t)}, \ldots, b_0^{(i)} y_1^{(f)} z_{N_4-1}^{(t)}, \ldots, b_{L-1}^{(i)} y_{N_3-1}^{(f)} z_0^{(t)}, \ldots, b_{L-1}^{(i)} y_{N_3-1}^{(f)} z_{N_4-1}^{(t)}\right]^T.$$

Alternatively, their Kronecker product can be given by $a^{(\rho(i,f,t))}$ where $\rho(i,f,t)$ permutes indices (i,f,t) as one of (i,f,t), (i,t,f), (f,i,t), (f,t,i), (t,i,f), (t,f,i). Then, $a^{(\rho(i,f,t))}$ is expressed based on the permutation function $\rho$.

In one example, the basis is determined based on three separate sets, a first set for L SD basis vectors $\{b^{(i)}:$ i=0, . . . , L−1}, a second set for M FD basis vectors $\{y^{(f)}:$ f=0, . . . , M−1}, and a third set for Q DD/TD basis vectors $\{z^{(t)}:$ t=0, . . . , Q−1}. The number of Kronecker product vectors is LMQ.

When $b^{(i)}$ is according to one or more examples described herein, $$W_1 = [a^{(0,0,0)} \ldots a^{(0,0,Q-1)}, \ldots, a^{(L-1,M-1,0)} \ldots a^{(L-1,M-1,Q-1)}]$$

When $b^{(i)}$ is according to one or more examples described herein, $$W_1 = \begin{bmatrix} a^{(0,0,0)} \ldots a^{(0,0,Q-1)}, \\ \ldots, a^{(L-1,M-1,0)} \ldots \\ a^{(L-1,M-1,Q-1)} \end{bmatrix} \quad \begin{matrix} 0 \end{matrix} \quad \begin{matrix} a^{(0,0,0)} \ldots a^{(0,0,Q-1)}, \\ \ldots, a^{(L-1,M-1,0)} \ldots \\ a^{(L-1,M-1,Q-1)} \end{matrix}$$

In one example, the basis is determined based on one set comprising L triples of (SD,FD,DD/TD) vectors $\{(b^{(i_k)}, y^{(f_k)}, z^{(t_k)}):$ k=0, . . . , L−1}.

When $b^{(i)}$ is according to one or more examples described herein, $$W_1 = [a^{(i_0,f_0,t_0)}, a^{(i_1,f_1,t_1)}, \ldots, a^{(i_{L-1},f_{L-1},t_{L-1})}].$$

When $b^{(i)}$ is according to one or more examples described herein, $$W_1 = \begin{bmatrix} a^{(i_0,f_0,t_0)}, a^{(i_1,f_1,t_1)}, \ldots, \\ a^{(i_{L-1},f_{L-1},t_{L-1})} \end{bmatrix} \quad \begin{matrix} 0 \end{matrix} \quad \begin{matrix} a^{(i_0,f_0,t_0)}, a^{(i_1,f_1,t_1)}, \ldots, \\ a^{(i_{L-1},f_{L-1},t_{L-1})} \end{matrix}$$

In one example, a basis entity is across SD, FD, and DD/TD units and corresponds to a joint vector across SD and FD, and a separate vector across DD/TD. In one example, the joint vectors are used to represent joint SD-FD Eigenvectors ($e_i$) of the channel H in which the SD and FD are concatenated together as one dimension. For example, when H is a $XN_3 \times N_4 \times N_r$ matrix, where $N_r$ is the number of antenna at the UE 116, then the joint vectors are used for the first dimension (of size $XN_3$) and the separate vectors are used for the second dimension (of size $N_4$).

In one example, a basis entity is across SD, FD, and DD/TD units and corresponds to a joint vector across SD and DD/TD, and a separate vector across FD. In one example, the joint vectors are used to represent joint SD-DD/TD Eigenvectors ($e_i$) of the channel H in which the SD and DD/TD are concatenated together as one dimension. For example, when H is a $XN_4 \times N_3 \times N_r$ matrix, where $N_r$ is the number of antenna at the UE 116, the joint vectors are used for the first dimension (of size $XN_4$) and the separate vectors are used for the second dimension (of size $N_3$).

In one example, a basis entity is across SD, FD, and DD/TD units and corresponds to a joint vector across FD and DD/TD, and a separate vector across SD. In one example, the joint vectors are used to represent joint FD-DD/TD Eigenvectors ($e_i$) of the channel H in which the FD and DD/TD are concatenated together as one dimension. For example, when H is a $N_3 N_4 \times X \times N_r$ matrix, where $N_r$ is the number of antenna at the UE 116, the joint vectors are used for the first dimension (of size $N_3 N_4$) and the separate vectors are used for the second dimension (of size X).

In one example, a basis entity is across SD, FD, and DD/TD units and corresponds to a joint vector across SD, FD, and DD/TD. In one example, the joint vectors are used to represent joint SD-FD-DD/TD Eigenvectors ($e_i$) of the channel H in which the SD, FD, and DD/TD are concatenated together as one dimension. For example, when H is a $XN_3 N_4 \times N_r$ matrix, where $N_r$ is the number of antenna at the UE 116, the joint vectors are used for the first dimension (of size $XN_3 N_4$).

In one example, a basis entity is a 2D matrix, hence the basis comprises a set of 2D matrices.

In one example, a basis entity is across SD and FD units and corresponds to a 2D matrix that is an outer product of two separate vectors ($b^{(i)}$ of length X and $y^{(f)}$ of length $N_3$), one for SD and one for FD. When $$b^{(i)} = \left[ b_0^{(i)}, b_1^{(i)}, \ldots, b_{X-1}^{(i)} \right] \text{ and } y^{(f)} = \left[ y_0^{(f)}, \ldots, y_{N_3-1}^{(f)} \right]^T,$$

their outer product is a matrix given by $C^{(i,f)}$ or $C^{(f,i)}$, where $C^{(i,f)} = b^{(i)} y^{(f)^T}$ or $b^{(i)} y^{(f)*}$ is an $X \times N_3$ matrix, and $C^{(f,i)} = y^{(f)} b^{(i)^T}$ or $y^{(f)} b^{(i)*}$ is an $N_3 \times X$ matrix.

In one example, the basis is determined based on two separate sets, a first set for L SD basis vectors {$b^{(i)}$: i=0, . . . , L−1} and a second set for M FD basis vectors {$y^{(f)}$:f=0, . . . , M−1}. The number of outer product matrices is LM.

When $b^{(i)}$ is according to one or more examples described herein, $$W_1 = [C^{(0,0)} \ldots C^{(0,\beta-1)}, C^{(1,0)} \ldots C^{(1,\beta-1)}, \ldots,$$
$$C^{(\alpha-1,0)} \ldots C^{(\alpha-1,\beta-1)}]$$

When $b^{(i)}$ is according to one or more examples described herein, $$W_1 = \begin{bmatrix} \begin{matrix} C^{(0,0)} \ldots C^{(0,\beta-1)}, C^{(1,0)} \\ \ldots C^{(1,\beta-1)}, \ldots, \\ C^{(\alpha-1,0)} \ldots C^{(\alpha-1,\beta-1)} \end{matrix} & 0 \\ 0 & \begin{matrix} C^{(0,0)} \ldots C^{(0,\beta-1)}, C^{(1,0)} \\ \ldots C^{(1,\beta-1)}, \ldots, \\ C^{(\alpha-1,0)} \ldots C^{(\alpha-1,\beta-1)} \end{matrix} \end{bmatrix}$$

Here, $(\alpha, \beta) = (L, M)$ or $(M, L)$.

In one example, the basis is determined based on one set comprising L pairs of (SD,FD) vectors {($b^{(i,k)}, y^{(f,k)}$): k=0, . . . , L−1}.

When $b^{(i)}$ is according to one or more examples described herein, $$W_1 = [C^{(\alpha_0, \beta_0)}, C^{(\alpha_1, \beta_1)}, \ldots, C^{(\alpha_{L-1}, \beta_{L-1})}].$$

When $b^{(i)}$ is according to one or more examples described herein, $$W_1 = \begin{bmatrix} \begin{matrix} C^{(\alpha_0, \beta_0)}, C^{(\alpha_1, \beta_1)}, \\ \ldots, C^{(\alpha_{L-1}, \beta_{L-1})} \end{matrix} & 0 \\ 0 & \begin{matrix} C^{(\alpha_0, \beta_0)}, C^{(\alpha_1, \beta_1)}, \\ \ldots, C^{(\alpha_{L-1}, \beta_{L-1})} \end{matrix} \end{bmatrix}.$$

Here, $(\alpha, \beta) = (i, f)$ or $(f, i)$.

In one example, a basis entity is across SD and DD/TD units and corresponds to a 2D matrix that is an outer product of two separate vectors ($b^{(i)}$ of length X and $z^{(t)}$ of length $N_4$), one for SD and one for DD/TD. When $$b^{(i)} = \left[ b_0^{(i)}, b_1^{(i)}, \ldots, b_{X-1}^{(i)} \right] \text{ and } z^{(t)} = \left[ z_0^{(t)}, \ldots, z_{N_4-1}^{(t)} \right]^T,$$

their outer product is a matrix given by $D^{(i,t)}$ or $D^{(t,i)}$, where $D^{(i,t)} = b^{(i)} z^{(z)^T}$ or $b^{(i)} z^{(t)*}$ is an $X \times N_4$ matrix, and $D^{(t,i)} = z^{(t)} b^{(i)^T}$ or $z^{(t)} b^{(i)*}$ is an $N_4 \times X$ matrix.

In one example, the basis is determined based on two separate sets, a first set for L SD basis vectors {$b^{(i)}$: i=0, . . . , L−1} and a second set for Q FD basis vectors {$z^{(t)}$:t=0, . . . , Q−1}. The number of outer product matrices is LQ.

When $b^{(i)}$ is according to one or more examples described herein, $$W_1 = [D^{(0,0)} \ldots D^{(0,\beta-1)}, D^{(1,0)} \ldots D^{(1,\beta-1)}, \ldots,$$
$$D^{(\alpha-1,0)} \ldots D^{(\alpha-1,\beta-1)}].$$

When $b^{(i)}$ is according to one or more examples described herein, $$W_1 = \begin{bmatrix} \begin{matrix} D^{(0,0)} \ldots D^{(0,\beta-1)}, \\ D^{(1,0)} \ldots D^{(1,\beta-1)}, \ldots, \\ D^{(\alpha-1,0)} \ldots D^{(\alpha-1,\beta-1)} \end{matrix} & 0 \\ 0 & \begin{matrix} D^{(0,0)} \ldots D^{(0,\beta-1)}, \\ D^{(1,0)} \ldots D^{(1,\beta-1)}, \ldots, \\ D^{(\alpha-1,0)} \ldots D^{(\alpha-1,\beta-1)} \end{matrix} \end{bmatrix}$$

Here, $(\alpha, \beta) = (L, Q)$ or $(Q, L)$.

In one example, the basis is determined based on one set comprising L pairs of (SD,DD) vectors {($b^{(i,k)}, z^{(t,k)}$): k=0, . . . , L−1}.

When $b^{(i)}$ is according to one or more examples described herein, $$W_1 = [D^{(\alpha_0, \beta_0)}, D^{(\alpha_1, \beta_1)}, \ldots, D^{(\alpha_{L-1}, \beta_{L-1})}]$$

When $b^{(i)}$ is according to one or more examples described herein, $$W_1 = \begin{bmatrix} \begin{matrix} D^{(\alpha_0, \beta_0)}, D^{(\alpha_1, \beta_1)}, \\ \ldots, D^{(\alpha_{L-1}, \beta_{L-1})} \end{matrix} & 0 \\ 0 & \begin{matrix} D^{(\alpha_0, \beta_0)}, D^{(\alpha_1, \beta_1)}, \\ \ldots, D^{(\alpha_{L-1}, \beta_{L-1})} \end{matrix} \end{bmatrix}.$$

Here, $(\alpha, \beta) = (i, t)$ or $(t, i)$.

In one example, a basis entity is across FD and DD/TD units and corresponds to a 2D matrix that is an outer product of two separate vectors ($y^{(f)}$ of length $N_3$ and $z^{(t)}$ of length $N_4$), one for FD and one for DD/TD. When $$y^{(f)} = \left[ y_0^{(f)}, \dots, y_{N_3-1}^{(f)} \right]^T \text{ and } z^{(t)} = \left[ z_0^{(t)}, \dots, z_{N_4-1}^{(t)} \right]^T,$$

their outer product is a matrix given by $E^{(f,t)}$ or $E^{(t,f)}$, where $E^{(f,t)}=y^{(f)}z^{(t)^T}$ or $y^{(f)}z^{(t)*}$ is an $N_3 \times N_4$ matrix, and $E^{(t,f)}=z^{(t)}y^{(f)^T}$ or $z^{(t)}y^{(f)*}$ is an $N_4 \times N_3$ matrix.

In one example, the basis is determined based on two separate sets, a first set for M FD basis vectors $\{y^{(f)}: f=0, \dots, M-1\}$ and a second set for Q FD basis vectors $\{z^{(t)}:t=0, \dots, Q-1\}$. The number of outer product matrices is MQ. The basis is then given by $$W_1 = [E^{(0,0)} \dots E^{(0,\beta-1)}, E^{(1,0)} \dots E^{(1,\beta-1)}, \dots, \\ E^{(\alpha-1,0)} \dots E^{(\alpha-1,\beta-1)}]$$

Here, $(\alpha,\beta)=(M,Q)$ or $(Q,M)$.

In one example, the basis is determined based on one set comprising M pairs of (FD,DD) vectors $\{(y^{(f_k)}, z^{(t_k)}): k=0, \dots, M-1\}$.

$$W_1 = [E^{(\alpha_0,\beta_0)}, E^{\alpha_1,\beta_1}), \dots, E^{(\alpha_{M-1},\beta_{M-1})}]$$

Here, $(\alpha,\beta)=(f,t)$ or $(t,f)$.

In one example, a basis entity is across SD, FD, and DD/TD units and corresponds to a joint vector across SD and FD, and a separate vector across DD/TD. In one example, the joint vectors are used to represent joint SD-FD Eigenvectors $(e_i)$ of the channel H in which the SD and FD are concatenated together as one dimension. When $$s^{(j)} = \left[ s_0^{(j)}, s_1^{(j)}, \dots, s_{XN_3-1}^{(j)} \right]^T \text{ and } z^{(t)} = \left[ z_0^{(t)}, \dots, z_{N_4-1}^{(t)} \right]^T$$

are joint SD-FD and separate DD/TD vectors, their outer product is a matrix given by $S^{(j,t)}$ or $S^{(t,j)}$, where $S^{(j,t)}=s^{(j)}z^{(t)^T}$ or $s^{(j)}z^{(t)*}$ is an $XN_3 \times N_4$ matrix, and $S^{(t,j)}=z^{(t)}s^{(j)^T}$ or $z^{(t)}s^{(j)*}$ is an $XN_3 \times N_4$ matrix.

In one example, the basis is determined based on two separate sets, a first set for L SD-FD joint basis vectors $\{s^{(j)}:j=0, \dots, L-1\}$ and a second set for Q DD/TD basis vectors $\{z^{(t)}:t=0, \dots, Q-1\}$. The number of outer product matrices is LQ.

When $b^{(i)}$ is according to example, $$W_1 = [S^{(0,0)} \dots S^{(0,\beta-1)}, S^{(1,0)} \dots S^{(1,\beta-1)}, \dots, \\ S^{(\alpha-1,0)} \dots S^{(\alpha-1,\beta-1)}]$$

When $b^{(i)}$ is according to one or more examples described herein, $$W_1 = \begin{bmatrix} S^{(0,0)} \dots S^{(0,\beta-1)}, \\ S^{(1,0)} \dots S^{(1,\beta-1)}, \dots, & 0 \\ S^{(\alpha-1,0)} \dots S^{(\alpha-1,\beta-1)} \\ & S^{(0,0)} \dots S^{(0,\beta-1)}, \\ 0 & S^{(1,0)} \dots S^{(1,\beta-1)}, \dots, \\ & S^{(\alpha-1,0)} \dots S^{(\alpha-1,\beta-1)} \end{bmatrix}$$

Here, $(\alpha, \beta) = (L, Q)$ or $(Q, L)$.

In one example, the basis is determined based on one set comprising L pairs of (joint SD-FD, DD/TD) vectors $\{(s^{(j_k)}, z^{(t_k)}):k=0, \dots, L-1\}$.

When $b^{(i)}$ is according to one or more examples described herein, $$W_1 = [S^{(\alpha_0,\beta_0)}, S^{\alpha_1,\beta_1}), \dots, S^{(\alpha_{L-1},\beta_{L-1})}]$$

When $b^{(i)}$ is according to one or more examples described herein, $$W_1 = \begin{bmatrix} S^{(\alpha_0,\beta_0)}, S^{(\alpha_1,\beta_1)}, \\ \dots, S^{(\alpha_{L-1},\beta_{L-1})} & 0 \\ & S^{(\alpha_0,\beta_0)}, S^{(\alpha_1,\beta_1)}, \\ 0 & \dots, S^{(\alpha_{L-1},\beta_{L-1})} \end{bmatrix}.$$

Here, $(\alpha, \beta) = (j, t)$ or $(t, j)$.

In one example, a basis entity is across SD, FD, and DD/TD units and corresponds to a joint vector across SD and DD/TD, and a separate vector across FD. In one example, the joint vectors are used to represent joint SD-DD/TD Eigenvectors $(e_i)$ of the channel H in which the SD and DD/TD are concatenated together as one dimension. When $$s^{(j)} = \left[ s_0^{(j)}, s_1^{(j)}, \dots, s_{XN_4-1}^{(j)} \right]^T$$

and $$y^{(f)} = \left[ y_0^{(f)}, \dots, y_{N_3-1}^{(f)} \right]^T$$

are joint SD-DD/TD and separate FD vectors, their outer product is a matrix given by $S^{(j,f)}$ or $S^{(f,j)}$, where $S^{(j,f)}=s^{(j)}y^{(f)^T}$ or $s^{(j)}y^{(f)*}$ is an $XN_4 \times N_3$ matrix, and $S^{(f,j)}=y^{(f)}s^{(j)^T}$ or $y^{(f)}s^{(j)*}$ is an $XN_4 \times N_3$ matrix.

In one example, the basis is determined based on two separate sets, a first set for L SD-DD/TD joint basis vectors $\{s^{(j)}:j=0, \dots, L-1\}$ and a second set for M FD basis vectors $\{y^{(f)}:f=0, \dots, M-1\}$. The number of outer product matrices is LM.

When $b^{(i)}$ is according to example, $$W_1 = [S^{(0,0)} \dots S^{(0,\beta-1)}, S^{(1,0)} \dots S^{(1,\beta-1)}, \dots, S^{(\alpha-1,0)} \\ \dots S^{(\alpha-1,\beta-1)}]$$

When $b^{(i)}$ is according to one or more examples described herein, $$W_1 = \begin{bmatrix} S^{(0,0)} \dots S^{(0,\beta-1)}, \\ S^{(1,0)} \dots S^{(1,\beta-1)}, \dots, & 0 \\ S^{(\alpha-1,0)} \dots S^{(\alpha-1,\beta-1)} \\ & S^{(0,0)} \dots S^{(0,\beta-1)}, \\ 0 & S^{(1,0)} \dots S^{(1,\beta-1)}, \dots, \\ & S^{(\alpha-1,0)} \dots S^{(\alpha-1,\beta-1)} \end{bmatrix}$$

Here, $(\alpha, \beta) = (L, M)$ or $(M, L)$.

In one example, the basis is determined based on one set comprising L pairs of (joint SD-DD/TD, FD) vectors $\{(s^{(j_k)}, y^{(t_k)}):k=0, \dots, L-1\}$.

When $b^{(i)}$ is according to one or more examples described herein, $$W_1 = [S^{(\alpha_0,\beta_0)}, S^{\alpha_1,\beta_1}), \dots, S^{(\alpha_{L-1},\beta_{L-1})}]$$

When $b^{(i)}$ is according to one or more examples described herein, $$W_1 = \begin{bmatrix} S^{(\alpha_0,\beta_0)}, S^{(\alpha_1,\beta_1)}, & & 0 \\ \dots, S^{(\alpha_{L-1},\beta_{L-1})} & & \\ & S^{(\alpha_0,\beta_0)}, S^{(\alpha_1,\beta_1)}, & \\ 0 & \dots, S^{(\alpha_{L-1},\beta_{L-1})} \end{bmatrix}.$$

Here, $(\alpha, \beta) = (j, f)$ or $(f, j)$.

In one example, a basis entity is across SD, FD, and DD/TD units and corresponds to a joint vector across FD and DD/TD, and a separate vector across SD. In one example, the joint vectors are used to represent joint FD-DD/TD Eigenvectors ($e_i$) of the channel H in which the FD and DD/TD are concatenated together as one dimension. When $$s^{(j)} = \left[s_0^{(j)}, s_1^{(j)}, \dots, s_{N_3 N_4 -1}^{(j)}\right]^T \text{ and } b^{(i)} = \left[b_0^{(i)}, \dots, b_{X-1}^{(i)}\right]^T$$

are joint FD-DD/TD and separate SD vectors, their outer product is a matrix given by $S^{(i,j)}$ or $S^{(j,i)}$, where $S^{(j,i)} = s^{(j)} b^{(i)^T}$ or $s^{(j)} b^{(i)*}$ is an $N_3 N_4 \times X$ matrix, and $S^{(i,j)} = b^{(i)} s^{(j)^T}$ or $b^{(i)} s^{(j)*}$ is an $N_3 N_4 \times X$ matrix.

In one example, the basis is determined based on two separate sets, a first set for M FD-DD/TD joint basis vectors $\{s^{(j)}: j=0, \dots, M-1\}$ and a second set for L SD basis vectors $\{b^{(i)}: i=0, \dots, L-1\}$. The number of outer product matrices is ML.

When $b^{(i)}$ is according to one or more examples described herein, $$W_1 = [S^{(0,0)} \dots S^{(0,\beta-1)}, S^{(1,0)} \dots S^{(1,\beta-1)}, \dots, S^{(\alpha-1,0)} \dots S^{(\alpha-1,\beta-1)}]$$

When $b^{(i)}$ is according to one or more examples described herein, $$W_1 = \begin{bmatrix} S^{(0,0)} \dots S^{(0,\beta-1)}, & & \\ S^{(1,0)} \dots S^{(1,\beta-1)}, \dots, & & 0 \\ S^{(\alpha-1,0)} \dots S^{(\alpha-1,\beta-1)} & & \\ & S^{(0,0)} \dots S^{(0,\beta-1)}, & \\ 0 & S^{(1,0)} \dots S^{(1,\beta-1)}, \dots, & \\ & S^{(\alpha-1,0)} \dots S^{(\alpha-1,\beta-1)} \end{bmatrix}$$

Here, $(\alpha, \beta) = (M, L)$ or $(L, M)$.

In one example, the basis is determined based on one set comprising L pairs of (joint FD-DD/TD, SD) vectors $\{(s^{(j_k)}, b^{(i_k)}): k=0, \dots, L-1\}$.

When $b^{(i)}$ is according to one or more examples described herein, $$W_1 = [S^{(\alpha_0,\beta_0)}, S^{(\alpha_1,\beta_1)}, \dots, S^{(\alpha_{L-1},\beta_{L-1})}]$$

When $b^{(i)}$ is according to one or more examples described herein, $$W_1 = \begin{bmatrix} S^{(\alpha_0,\beta_0)}, S^{(\alpha_1,\beta_1)}, & & 0 \\ \dots, S^{(\alpha_{L-1},\beta_{L-1})} & & \\ & S^{(\alpha_0,\beta_0)}, S^{(\alpha_1,\beta_1)}, & \\ 0 & \dots, S^{(\alpha_{L-1},\beta_{L-1})} \end{bmatrix}.$$

Here, $(\alpha, \beta) = (j, i)$ or $(i, j)$.

In one example, a basis entity is a 3D matrix, hence the basis comprises a set of 3D matrices.

In one example, a basis entity is across SD, FD, and DD/TD units and corresponds to a 3D matrix that is an outer (or tensor) product of three separate vectors ($b^{(i)}$ of length X, $y^{(f)}$ of length $N_3$, and $z^{(t)}$ of length $N_4$), one for SD, one for FD, and one for DD/TD. When $$b^{(i)} = \left[b_0^{(i)}, b_1^{(i)}, \dots, b_{X-1}^{(i)}\right]^T, y^{(f)} = \left[y_0^{(f)}, \dots, y_{N_3-1}^{(f)}\right]^T,$$

and $$z^{(t)} = \left[z_0^{(t)}, \dots, z_{N_4-1}^{(t)}\right]^T,$$

their outer (tensor) product is a 3D matrix given by $A^{(i,f,t)}$, where $$A^{(i,f,t)} = \left[A_0^{(i,f,t)}, \dots, A_{N_4-1}^{(i,f,t)}\right]$$

is a concatenation of $N_4$ 2D matrices along the $3^{rd}$ dimension, d-th 2D matrix is $$A_d^{(i,f,t)} = \left(b^{(i)} y^{(f)^T}\right) z_d^{(t)} = C^{(i,f)} z_d^{(t)}$$

of size $X \times N_3$ that corresponds to d-th DD unit.

Alternatively, their outer (tensor) product can be given by $A^{(\rho(i,f,t))}$ where $\rho(i,f,t)$ permutes indices (i,f,t) as one of (i,f,t), (i,t,f), (f,i,t), (f,t,i), (t,i,f), (t,f,i). Then, $A^{(\rho(i,f,t))}$ is expressed based on the permutation function $\rho$.

In one example, the basis is determined based on three separate sets: a first set for L SD basis vectors $\{b^{(i)}: i=0, \dots, L-1\}$, a second set for M FD basis vectors $\{y^{(f)}: f=0, \dots, M-1\}$, and a third set for Q DD/TD basis vectors $\{z^{(t)}: t=0, \dots, Q-1\}$. The number of outer product matrices is LMQ.

When $b^{(i)}$ is according to one or more examples described herein, $$W_1 = [A^{(0,0,0)} \dots A^{(0,0,Q-1)}, \dots, A^{(L-1,M-1,0)} \dots A^{(L-1,M-1,Q-1)}]$$

When $b^{(i)}$ is according to one or more examples described herein, $$W_1 = \begin{bmatrix} A^{(0,0,0)} \dots A^{(0,0,Q-1)}, & & \\ \dots, A^{(L-1,M-1,0)} & & 0 \\ \dots A^{(L-1,M-1,Q-1)} & & \\ & A^{(0,0,0)} \dots A^{(0,0,Q-1)}, & \\ 0 & \dots, A^{(L-1,M-1,0)} & \\ & \dots A^{(L-1,M-1,Q-1)} \end{bmatrix}$$

In one example, the basis is determined based on one set comprising L triples of (SD,FD,DD/TD) vectors $\{(b^{(i_k)}, y^{(f_k)}, z^{(t_k)}): k=0, \dots, L-1\}$.

When $b^{(i)}$ is according to one or more examples described herein, $$W_1 = [A^{(i_0,f_0,t_0)}, A^{(i_1,f_1,t_1)}, \dots, A^{(i_{L-1},f_{L-1},t_{L-1})}]$$

When $b^{(i)}$ is according to one or more examples described herein, $$W_1 = \begin{bmatrix} A^{(i_0,f_0,t_0)}, A^{(i_1,f_1,t_1)}, \dots, & 0 \\ \quad A^{(i_{L-1},f_{L-1},t_{L-1})} & \\ & A^{(i_0,f_0,t_0)}, A^{(i_1,f_1,t_1)}, \dots, \\ 0 & \quad A^{(i_{L-1},f_{L-1},t_{L-1})} \end{bmatrix}$$

In one example, the UE 116 is provided with an additional information regarding the basis. The additional information can include at least one of the following:

Whether the basis is across SD or/and FD or/and DD/TD units.

When the basis includes more than one of SD, FD, and DD/TD, whether the basis is separate or joint.

Whether the basis comprises vectors or/and matrices (2D or 3D).

In one example, this additional information is configured via RRC. It can be implicit, e.g., based on other (existing) RRC parameter(s). Or, it can be explicit, e.g., via a dedicated RRC parameter.

In one example, this additional information is indicated via a MAC CE. It can be implicit, e.g., based on other (existing) codepoint in a MAC CE. Or, it can be explicit, e.g., via a dedicated codepoint in a MAC CE.

In one example, this additional information is indicated via a DCI. It can be implicit, e.g., based on other (existing) field in a DCI. Or, it can be explicit, e.g., via a dedicated field in a DCI.

In one example, the additional information is provided subject to a UE capability reported by the UE 116.

In one embodiment, when the CSI report corresponds to a rank>1 (number of layer v>1), the basis can be determined/configured according to at least one of the following examples.

In example, the basis is layer-common, i.e., it is the same for each of the layers (implying only one basis is key for each of the layers). As explained herein, the basis can be across SD units only, or across SD and FD units, or, across SD and DD/TD units, or across FD and DD/DD units, or across SD, FD, and DD/TD units. When at least 2 of SD, FD, and/or DD/TD are included in the basis, they can be separate or joint.

In example, the basis is layer-specific, i.e., the basis includes one separate/independent (per-layer) basis for each layer. The per-layer basis can be across SD units only, or across SD and FD units, or, across SD and DD/TD units, or across FD and DD/DD units, or across SD, FD, and DD/TD units. When at least 2 of SD, FD, and/or DD/TD are included in the basis, they can be separate or joint.

In one example, the basis is a combination of layer-common and layer-specific, i.e., it includes both layer-common as layer-specific components.

In one example, the basis is across SD and FD units, the SD basis is common for each of the layers, and the FD basis is separate/independent for each layer.

In one example, the basis is across SD and FD units, the FD basis is common for each of the layers, and the SD basis is separate/independent for each layer.

In one example, the basis is across SD and DD/TD units, the SD basis is common for each of the layers, and the DD/TD basis is separate/independent for each layer.

In one example, the basis is across SD and DD/TD units, the DD/TD basis is common for each of the layers, and the SD basis is separate/independent for each layer.

In one example, the basis is across FD and DD/TD units, the FD basis is common for each of the layers, and the DD/TD basis is separate/independent for each layer.

In one example, the basis is across FD and DD/TD units, the DD/TD basis is common for each of the layers, and the FD basis is separate/independent for each layer.

In one example, the basis is across SD, FD, and DD/TD units, the SD basis is common for each of the layers, the FD basis is separate/independent for each layer, and the DD/TD basis is separate/independent for each layer.

In one example, the basis is across SD, FD, and DD/TD units, the FD basis is common for each of the layers, the SD basis is separate/independent for each layer, and the DD/TD basis is separate/independent for each layer.

In one example, the basis is across SD, FD, and DD/TD units, the DD/TD basis is common for each of the layers, the FD basis is separate/independent for each layer, and the SD basis is separate/independent for each layer.

In one example, the basis is across SD, FD, and DD/TD units, the SD basis is common for each of the layers, the FD basis is common for each of the layers, and the DD/TD basis is separate/independent for each layer.

In one example, the basis is across SD, FD, and DD/TD units, the SD basis is common for each of the layers, the DD/TD basis is common for each of the layers, and the FD basis is separate/independent for each layer.

In one example, the basis is across SD, FD, and DD/TD units, the DD/TD basis is common for each of the layers, the FD basis is common for each of the layers, and the SD basis is separate/independent for each layer.

When at least 2 of SD, FD, and/or DD/TD are included in the basis, they can be separate or joint.

In one embodiment, when the CSI report corresponds to (is across) $N_g$>1 AGs, the basis can be determined/configured according to at least one of the examples described herein.

In one example, the basis is AG-common, i.e., it is the same for each of the AGs (implying only one basis is key for each of the AGs). As explained herein, the basis can be across SD units only, or across SD and FD units, or, across SD and DD/TD units, or across FD and DD/DD units, or across SD, FD, and DD/TD units. When at least 2 of SD, FD, and/or DD/TD are included in the basis, they can be separate or joint.

In one example, the basis is AG-specific, i.e., the basis includes one separate/independent (per-AG) basis for each AG. The per-AG basis can be across SD units only, or across SD and FD units, or, across SD and DD/TD units, or across FD and DD/DD units, or across SD, FD, and DD/TD units. When at least 2 of SD, FD, and/or DD/TD are included in the basis, they can be separate or joint In one example, the basis is a combination of AG-common and AG-specific, i.e., it includes both AG-common as AG-specific components.

In one example, the basis is across SD and FD units, the SD basis is common for each of the AGs, and the FD basis is separate/independent for each AG.

In one example, the basis is across SD and FD units, the FD basis is common for each of the AGs, and the SD basis is separate/independent for each AG.

In one example, the basis is across SD and DD/TD units, the SD basis is common for each of the AGs, and the DD/TD basis is separate/independent for each AG.

In one example, the basis is across SD and DD/TD units, the DD/TD basis is common for each of the AGs, and the SD basis is separate/independent for each AG.

In one example, the basis is across FD and DD/TD units, the FD basis is common for each of the AGs, and the DD/TD basis is separate/independent for each AG.

In one example, the basis is across FD and DD/TD units, the DD/TD basis is common for each of the AGs, and the FD basis is separate/independent for each AG.

In one example, the basis is across SD, FD, and DD/TD units, the SD basis is common for each of the AGs, the FD basis is separate/independent for each AG, and the DD/TD basis is separate/independent for each AG.

In one example, the basis is across SD, FD, and DD/TD units, the FD basis is common for each of the AGs, the SD basis is separate/independent for each AG, and the DD/TD basis is separate/independent for each AG.

In one example, the basis is across SD, FD, and DD/TD units, the DD/TD basis is common for each of the AGs, the FD basis is separate/independent for each AG, and the SD basis is separate/independent for each AG.

In one example, the basis is across SD, FD, and DD/TD units, the SD basis is common for each of the AGs, the FD basis is common for each of the AGs, and the DD/TD basis is separate/independent for each AG.

In one example, the basis is across SD, FD, and DD/TD units, the SD basis is common for each of the AGs, the DD/TD basis is common for each of the AGs, and the FD basis is separate/independent for each AG.

In one example, the basis is across SD, FD, and DD/TD units, the DD/TD basis is common for each of the AGs, the FD basis is common for each of the AGs, and the SD basis is separate/independent for each AG.

When at least 2 of SD, FD, and/or DD/TD are included in the basis, they can be separate or joint.

In one embodiment, when the CSI report corresponds to (is across) $N_g > 1$ AGs, the UE 116 can be further configured with a selection of $n \leq N_g$ AG(s). This selection can be from a set of multiple AG selection hypotheses. The value of n can be fixed or determined based on $N_g$ or configured or reported by the UE 116. The set of multiple AG selection hypotheses can be fixed or determined based on $N_g$ or configured or reported by the UE 116.

In one example, this selection is configured to the UE 116 (e.g., via RRC or/and MAC CE or/and DCI).

In one example, this selection is performed by the UE 116. The UE 116 reports an information about this selection as part of the CSI report (e.g., via part 1 of a two-part CSI or UCI). Or the UE 116 can provide this information in a UE-initiated manner (e.g., the UE 116 can provide this information via MAC CE).

In one example, this selection is based on both NW-configuration and UE-report.

In one example, the NW-configuration can be a value of n or a set of values of n, and the UE-report can be the indices of n selected AGs (and the selected value of n, if it demands selection by the UE 116).

In one example, the NW-configuration can be the set of multiple AG selection hypotheses, and the UE-report can be the one hypothesis (or multiple hypotheses) selection from the configured set.

In one embodiment, when the CSI report corresponds to (is across) $N_g > 1$ AGs, the UE 116 can be provided with the number of CSI-RS ports ($P_{CSIRS,g}$) or/and ($N_{1,g}, N_{2,g}$) for g-th AG, where $P_{CSIRS,g}$ can be the same or different across AGs. This information can be provided via higher layer (RRC), or more dynamic signaling (MAC CE or/and DCI).

In one embodiment, the set of SD vectors ($b^{(i)}$ or $$b_r^{(i)})$$

comprises length X vectors.

In one example, $$X = \frac{P_{CSIRS}}{2} = N_1 N_2,$$

and the set of SD vectors $b^{(i)}$ or $$b_r^{(i)}$$

includes orthogonal DFT vectors in two-dimension (associated with $1^{st}$ and $2^{nd}$ antenna ports), i.e., $b^{(i)}$ or $$b_r^{(i)} = v_{m_1^{(i)}, m_2^{(i)}},$$

where the indices $$m_1^{(i)} \text{ and } m_2^{(i)}$$

are given by $$m_1^{(i)} = O_1 n_1^{(i)} + q_1$$
$$m_2^{(i)} = O_2 n_2^{(i)} + q_2$$

for $i = 0, 1, \ldots, L-1$, and the quantity $v_{l,m}$ is given by $$v_{l,m} = \left[ u_m e^{j\frac{2\pi l}{O_1 N_1}} u_m \ldots e^{j\frac{2\pi l(N_1-1)}{O_1 N_1}} u_m \right]^T$$

$$u_m = \begin{cases} \left[ 1 \ e^{j\frac{2\pi m}{O_2 N_2}} \ \ldots \ e^{j\frac{2\pi m(N_2-1)}{O_2 N_2}} \right] & N_2 > 1 \\ 1 & N_2 = 1 \end{cases}$$

Here, $q_1$ and $q_2$ are rotation factors in $1^{st}$ and $2^{nd}$ dimensions, respectively, and $$\left( n_1^{(i)}, n_2^{(i)} \right)$$

is the index of the i-th SD vector, $$q_1 \in \{0, 1, \ldots, O_1 - 1\}$$
$$q_2 \in \{0, 1, \ldots, O_2 - 1\}$$
$$n_1^{(i)} \in \{0, 1, \ldots, N_1 - 1\}$$
$$n_2^{(i)} \in \{0, 1, \ldots, N_2 - 1\}$$

In one example, the set of indices $$\{(n_1^{(i)}, n_2^{(i)})\}$$

are indicated by indices, e.g., PMI indices $i_{1,1}$ and $i_{1,2}$, where $$i_{1,1} = [q_1, q_2]$$

$$i_{1,2} \in \left\{0, 1, \dots, \binom{N_1 N_2}{L} - 1\right\}.$$

In one example, the oversampling factor $(O_1, O_2)$ is fixed, for example, $(4,4)$ when $N_2 > 1$, and $(4,1)$ when $N_2 = 1$. In one example, the oversampling factor $(O_1, O_2)$ is configured, e.g., via higher layer signaling.

In one example, $$X = \frac{P_{CSIRS}}{2},$$

and the set of SD vectors $b^{(i)}$ or $$b_r^{(i)}$$

includes port selection vectors, i.e., $b^{(i)}$ or $$b_r^{(i)} = v_{m^{(i)}}, \text{ and } v_{m^{(i)}}$$

is a $P_{CSI-RS}/2$-element column vector containing a value of 1 in the element of index $m^{(i)}$ and zeros elsewhere (where the first element is the element of index 0). Here, $K_1 = 2 L$ ports are selected from $P_{CSI-RS}$ ports based on $L$ vectors, $v_{m^{(i)}}$, $i = 0, 1, \dots, L-1$, which are identified by $$m = [m^{(0)} \ \dots \ m^{(L-1)}]$$

$$m^{(i)} \in \left\{0, 1, \dots, \frac{P_{CSI-RS}}{2} - 1\right\}$$

In one example, the set of indices $\{m^{(i)}\}$ are indicated by an index, e.g., a PMI index $i_{1,2}$, where $$i_{1,2} \in \left\{0, 1, \dots, \binom{P_{CSI-RS}/2}{L} - 1\right\}.$$

In one example, $$X = \frac{P_{CSIRS}}{2},$$

and the set of SD vectors can be partitioned into two, $B_1$ and $B_2$, which together determine a non-block diagonal $W_1$ matrix, e.g. a Hadamard matrix $$\begin{bmatrix} B_1 & B_2 \\ B_1 & -B_2 \end{bmatrix}.$$

In one example, $B_1$ and $B_2$ comprise orthogonal DFT vectors. In one example, $B_1$ and $B_2$ comprise port selection vectors. In one example, $B_1$ and $B_2$ comprise orthogonal DFT or port selection vectors based on a configuration.

In one example, $$X = \frac{P_{CSIRS}}{2},$$

and the set of SD vectors $b^{(i)}$ or $$b_r^{(i)}$$

includes Eigen (basis) vectors. In one example, the Eigen (basis) vectors correspond to $L$ Eigenvectors (e.g., with largest eigenvalues) of an average covariance matrix $K_{SD}$, where the average can be determined based on averaging over FD or/and DD units or/and $N_r$.

In one embodiment, the set of FD vectors $(y^{(f)})$ comprises length $N_3$ vectors.

In one example, the set of FD vectors $y^{(f)}$ includes orthogonal DFT vectors, i.e., $$y^{(f)} = \left[y_{0,l}^{(f)}, y_{1,l}^{(f)}, \dots, y_{N_3-1,l}^{(f)}\right]^T,$$

$$y_{t,l}^{(f)} = e^{j\frac{2\pi t n_{3,l}^{(f)}}{N_3}}$$

$$f = 0, 1, \dots, M-1,$$

are identified by $n_{3,l}$, where the subscript ($l = 1, \dots, v$) is the layer index, $$n_{3,l} = \left[n_{3,l}^{(0)}, \dots, n_{3,l}^{(M-1)}\right]$$

$$n_{3,l}^{(f)} \in \{0, 1, \dots, N_3 - 1\}$$

In one example, the set of indices $$\{n_{3,l}^{(f)}\}$$

are indicated by an index, e.g. PMI index $i_{1,6,l}$, where $$i_{1,6,l} \in \{0, 1, \dots, Y - 1\}$$

where $$Y = \binom{N_3 - 1}{M - 1} \text{ or } \binom{N_3}{M}.$$

When FD basis is layer-common (the same for each of the layers), then the subscript $l$ can be dropped/omitted.

In one example, the set of FD vectors $y^{(f)}$ or $$y_l^{(f)}$$

includes Eigen (basis) vectors. In one example, the Eigen (basis) vectors correspond to M Eigenvectors (e.g., with largest eigenvalues) of an average covariance matrix $K_{FD}$, where the average can be determined based on averaging over SD or/and DD units or/and $N_r$.

In one embodiment, the set of DD/TD vectors $(z^{(t)})$ comprises length $N_4$ vectors.

In one example, the set of FD vectors $z^{(t)}$ includes orthogonal DFT vectors, i.e., $$z^{(t)} = \left[ z_{0,l}^{(t)}, z_{1,l}^{(t)}, \ldots, z_{N_4-1,l}^{(t)} \right]^T,$$

$$z_{s,l}^{(t)} = e^{j \frac{2\pi s n_{4,l}^{(t)}}{N_4}}$$

$$t = 0, 1, \ldots, Q-1,$$

are identified by $n_{4,l}$, where the subscript $(l=1, \ldots, v)$ is the layer index, $$n_{4,l} = \left[ n_{4,l}^{(0)}, \ldots, n_{4,l}^{(Q-1)} \right]$$

$$n_{4,l}^{(t)} \in \{0, 1, \ldots, N_4 - 1\}$$

In one example, the set of indices $$\{n_{4,l}^{(t)}\}$$

are indicated by an index, e.g. PMI index $i_{1,9,l}$, where $$i_{1,9,l} \in \{0, 1, \ldots, Y-1\}$$

where $$Y = \binom{N_4 - 1}{Q - 1} \text{ or } \binom{N_4}{Q}.$$

When DD/TD basis is layer-common (the same for each of the layers), then the subscript l can be dropped/omitted.

In one example, the set of DD/TD vectors $z^{(t)}$ or $$z_l^{(t)}$$

includes Eigen (basis) vectors. In one example, the Eigen (basis) vectors correspond to Q Eigenvectors (e.g., with largest eigenvalues) of an average covariance matrix $K_{DD/TD}$, where the average can be determined based on averaging over SD or/and FD units or/and $N_r$.

In one embodiment, when the basis includes separate sets of SD and FD vectors or one set comprising pairs of (SD, FD) vectors, the set of SD vectors $(b^{(i)})$ can be determined/configured according to one or more examples described herein. The set of FD vectors $(y^{(f)})$ can be determined/configured according to one or more examples described herein.

In one embodiment, when the basis includes separate sets of SD and DD/TD vectors or one set comprising pairs of (SD, DD/TD) vectors, the set of SD vectors $(b^{(i)})$ can be determined/configured according to one or more examples described herein. The set of DD/TD vectors $(z^{(t)})$ can be determined/configured according to one or more examples described herein.

In one embodiment, when the basis includes separate sets of FD and DD/TD vectors or one set comprising pairs of (FD, DD/TD) vectors, the set of FD vectors $(y^{(f)})$ can be determined/configured according to one or more examples described herein. The set of DD/TD vectors $(z^{(t)})$ can be determined/configured according to one or more examples described herein.

In one embodiment, when the basis includes joint vectors across SD and FD, the set of joint vectors $c^{(i,f)}$ includes (joint) orthogonal DFT vectors across SD and FD (of length $XN_3$).

In one embodiment, when the basis includes joint vectors across SD and FD, the set of joint vectors $c^{(i,f)}$ includes joint Eigen (basis) vectors across SD and FD (of length $XN_3$). In one example, the joint Eigen (basis) vectors correspond to L Eigenvectors (e.g. with largest eigenvalues) of an average covariance matrix $K_{(SD,FD)}$, where the average can be determined based on averaging the $XN_3 \times N_4 \times N_r$ channel over DD/TD units or/and $N_r$.

In one embodiment, when the basis includes joint vectors across SD and DD/TD, the set of joint vectors $d^{(i,t)}$ includes (joint) orthogonal DFT vectors across SD and DD/TD (of length $XN_4$).

In one embodiment, when the basis includes joint vectors across SD and DD/TD, the set of joint vectors $d^{(i,t)}$ includes joint Eigen (basis) vectors across SD and DD/TD (of length $XN_4$). In one example, the joint Eigen (basis) vectors correspond to L Eigenvectors (e.g. with largest eigenvalues) of an average covariance matrix $K_{(SD,DD/TD)}$, where the average can be determined based on averaging the $XN_4 \times N_3 \times N_r$ channel over FD units or/and $N_r$.

In one embodiment, when the basis includes joint vectors across FD and DD/TD, the set of joint vectors $e^{(f,t)}$ includes (joint) orthogonal DFT vectors across FD and DD/TD (of length $N_3N_4$).

In one embodiment, when the basis includes joint vectors across FD and DD/TD, the set of joint vectors $e^{(f,t)}$ includes joint Eigen (basis) vectors across FD and DD/TD (of length $N_3N_4$). In one example, the joint Eigen (basis) vectors correspond to M Eigenvectors (e.g. with largest eigenvalues) of an average covariance matrix $K_{(FD,DD/TD)}$, where the average can be determined based on averaging the $N_3N_4 \times X \times N_r$ channel over SD units or/and $N_r$.

In one embodiment, when SD basis vectors are $P_{CSIRS} \times 1$, the precoders for v layers are then given by $$W_{\ldots,s,u}^l = \frac{1}{\sqrt{X\gamma_{s,u,l}}} \left[ \sum_{g=1}^{N_g} \sum_{i=0}^{L-1} v_{m_1^{(i)},m_2^{(i)},g} \sum_{f=0}^{M-1} \sum_{t=0}^{Q-1} y_{s,g,l}^{(f)} z_{u,g,l}^{(t)} x_{g,l,i,f,t} \right],$$

$$l = 1, \ldots, v,$$

$$\gamma_{s,u,l} = \sum_{g=1}^{N_g} \sum_{i=0}^{L-1} \left| \sum_{f=0}^{M-1} \sum_{t=0}^{Q-1} y_{s,g,l}^{(f)} z_{u,g,l}^{(t)} x_{g,l,i,f,t} \right|^2,$$

where
$X=P_{CSIRS}$ or $X=2N_1N_2$.
$i=0, \ldots, L-1$ is SD basis vector index.
$f=0, \ldots, M-1$ is FD basis vector index.
$t=0, \ldots, Q-1$ is DD/TD basis vector index.

g=1, ..., $N_g$ is AG index.

l=1, ..., v is layer index.

s=0, ..., $N_3-1$ is FD unit index.

u=0, ..., $N_4-1$ is DD/TD unit index.

$$v_{m_1^{(i)}, m_2^{(i)}, g}$$

includes SD basis vectors (as columns) associated with AG g.

$$y_{s,g,l}^{(f)}$$

is the s-th entry of the f-th FD basis vector associated with AG g and layer l.

$$z_{u,g,l}^{(t)}$$

is the u-th entry of the t-th DD/TD basis vector associated with AG g and layer l.

$x_{g,l,i,f,t}$ is the combing coefficient (an element of $W_2$) associated with codebook indices (g,l,i,f,t).

In one example, $$x_{g,l,i,f,t} = p_{l,g,\lfloor\frac{i}{L}\rfloor}^{(1)} p_{l,g,i,f,t}^{(2)} \varphi_{l,g,i,f,t}$$

similar to Rel. 16 enhanced Type II codebook (document and standard [8]).

In one embodiment, when SD basis vectors are $P_{CSIRS} \times 1$, the precoders for v layers are then given by $$W_{\ldots, s, u}^l = \frac{1}{\sqrt{X\gamma_{s,u,l}}} \begin{bmatrix} \sum_{g=1}^{N_g}\sum_{i=0}^{L-1} v_{m_1^{(i)}, m_2^{(i)}, g} \sum_{f=0}^{M-1}\sum_{t=0}^{Q-1} y_{s,g,l}^{(f)} z_{u,g,l}^{(t)} x_{g,l,i,f,t} \\ \sum_{g=1}^{N_g}\sum_{i=0}^{L-1} v_{m_1^{(i)}, m_2^{(i)}, g} \sum_{f=0}^{M-1}\sum_{t=0}^{Q-1} y_{s,g,l}^{(f)} z_{u,g,l}^{(t)} x_{g,l,i+L,f,t} \end{bmatrix},$$

$$l = 1, \ldots, v,$$

$$\gamma_{s,u,l} = \sum_{g=1}^{N_g}\sum_{i=0}^{2L-1}\left|\sum_{f=0}^{M-1}\sum_{k=0}^{Q-1} y_{s,g,l}^{(f)} z_{u,g,l}^{(t)} x_{g,l,i,f,t}\right|^2,$$

where

X=$P_{CSIRS}$ or X=$2N_1N_2$.

i=0, ..., L–1 is SD basis vector index.

f=0, ..., M–1 is FD basis vector index.

t=0, ..., Q–1 is DD/TD basis vector index.

g=1, ..., $N_g$ is AG index.

l=1, ..., v is layer index.

s=0, ..., $N_3-1$ is FD unit index.

u=0, ..., $N_4-1$ is DD/TD unit index.

$$v_{m_1^{(i)}, m_2^{(i)}, g}$$

includes SD basis vectors (as columns) associated with AG g.

$$y_{s,g,l}^{(f)}$$

is the s-th entry of the f-th FD basis vector associated with AG g and layer l.

$$z_{u,g,l}^{(t)}$$

is the u-th entry of the t-th DD/TD basis vector associated with AG g and layer l.

$x_{g,l,i,f,t}$ is the combing coefficient (an element of $W_2$) associated with codebook indices (g,l,i,f,t).

In one example, $$x_{g,l,i,f,t} = p_{l,g,\lfloor\frac{i}{L}\rfloor}^{(1)} p_{l,g,i,f,t}^{(2)} \varphi_{l,g,i,f,t}$$

similar to Rel. 16 enhanced Type II codebook (document and standard [8]).

Figure 14:
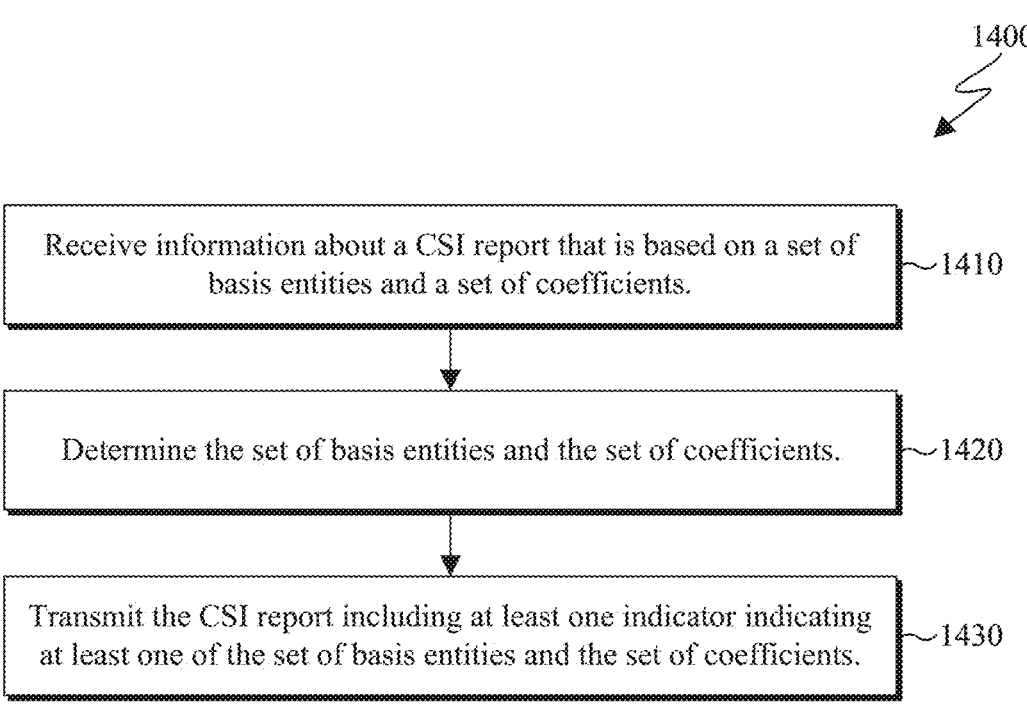
FIG. 14 illustrates an example method performed by a UE in a wireless communication system according to embodiments of the present disclosure.

FIG. 14 illustrates an example method 1400 performed by a UE in a wireless communication system according to embodiments of the present disclosure. The method 1400 of FIG. 14 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1400 is for illustration only and other embodiments can be used without departing from the scope of the present disclosure.

The method 1400 begins with the UE receiving information about a CSI report that is based on a set of basis entities and a set of coefficients (1410). The UE then determines the set of basis entities and the set of coefficients (1420). For example, in 1420, the set of basis entities and the set of coefficients are determined based on the received configuration information. In various embodiments, the set of basis entities is based on X dimensions, the set of coefficients is not based on the X dimensions and is from a set of convolutional-based coefficients, and X is associated with the CSI report and greater or equal to 1.

In various embodiments, the set of convolutional-based coefficients is determined based on a ML or AI based algorithm. The ML or AI based algorithm is based on a training using a predetermined set of coefficients from a codebook. The information indicates a type of the set of coefficients, the type indicated from among (a) a convolutional-based coefficients, which are learnt or adaptive, and (b) codebook-based coefficients, which are fixed or predetermined. To determine the CSI report, the UE identifies the type of the set of coefficients and determines the CSI report based on the identified type of the set of coefficients.

In various embodiments, each basis entity in the set of basis entities is a vector and the vector is at least one of the following vector types: separate for each dimension of the X dimensions and joint across at least two of the X dimensions. In various embodiments, each basis entity in the set of basis entities is a matrix and the matrix is at least one of the following matrix types: a Kronecker product of at least two vectors, and joint across at least two of the X dimensions.

In various embodiments, X is 3 and a first of the X=3 dimensions is associated with a SD, a second of the X=3 dimensions is associated with a FD, and a third of the X=3 dimensions is associated with a TD, where P is a number of SD units, $N_3$ is a number of FD units, and $N_4$ is a number of TD units. A value of P is based on properties associated with antenna ports, the properties being at least one of: (i) antenna structure, (ii) antenna polarization, (iii) antenna geometry including a shape or size, and (iv) locations including co-located or non-co-located, where $P\geq1$, $N_3\geq1$, and $N_4\geq1$. In various embodiments, the set of basis entities is based on a codebook, the codebook comprises vectors or matrices, and each of the vectors or matrices have a length or size that depends on at least one of the value of P, a value of $N_3$, and a value of $N_4$. In various embodiments, $P=sN_1N_2$, where $N_1$ and $N_2$ are a number of antenna ports associated with two dimensions, respectively, of a two-dimensional planar antenna array, and $s\in\{1,2\}$ is a number of polarizations associated with each location in the two-dimensional planar antenna array.

In various embodiments, the UE further receives information about $K\geq1$ antenna port groups (AGs), measures the K AGs, and determines the CSI report based on the measurement. The K AGs are measured via at least one of the X dimensions. Each of the K AGs includes at least one non-zero power (NZP) CSI-RS port.

The UE then transmits the CSI report including at least one indicator indicating at least one of the set of basis entities and the set of coefficients (1430).

Any of the above variation embodiments can be utilized independently or in combination with at least one other variation embodiment. The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:
    a transceiver configured to receive information about a channel state information (CSI) report, the report based on at least two components: a set of basis entities and a set of coefficients; and
    a processor operably coupled to the transceiver, the processor, based on the information, configured to determine the set of basis entities and the set of coefficients,
    wherein the transceiver is further configured to transmit the CSI report including at least one indicator indicating at least one of the set of basis entities and the set of coefficients,
    wherein the set of basis entities is based on X dimensions,
    wherein the set of coefficients is not based on the X dimensions and is from a set of convolutional-based coefficients, and
    wherein X is associated with the CSI report and $X\geq1$.

2. The UE of claim 1, wherein the set of convolutional-based coefficients is based on a machine-learning (ML) or artificial intelligence (AI) based algorithm.

3. The UE of claim 2, wherein:
    the ML or AI based algorithm is based on a training using a predetermined set of coefficients from a codebook,
    the information indicates a type of the set of coefficients, the type indicated from among (a) a convolutional-based coefficients, which are learnt or adaptive, and (b) codebook-based coefficients, which are fixed or predetermined, and
    the processor is further configured to:
        identify the type of the set of coefficients; and
        determine the CSI report based on the identified type of the set of coefficients.

4. The UE of claim 1, wherein:
    each basis entity in the set of basis entities is a vector, and
    the vector is at least one of the following vector types:
        separate for each dimension of the X dimensions, and
        joint across at least two of the X dimensions.

5. The UE of claim 1, wherein:
    each basis entity in the set of basis entities is a matrix, and
    the matrix is at least one of the following matrix types:
        a Kronecker product of at least two vectors, and
        joint across at least two of the X dimensions.

6. The UE of claim 1, wherein:
    X=3,
    a first of the X=3 dimensions is associated with a spatial-domain (SD), a second of the X=3 dimensions is associated with a frequency-domain (FD), and a third of the X=3 dimensions is associated with a time-domain (TD),
    P is a number of SD units, $N_3$ is a number of FD units, and $N_4$ is a number of TD units,
    a value of P is based on properties associated with antenna ports, the properties being at least one of: (i) antenna structure, (ii) antenna polarization, (iii) antenna geometry, including shape or size, and (iv) locations, including co-located or non-co-located, and
    $P\geq1$, $N_3\geq1$, and $N_4\geq1$.

7. The UE of claim 6, wherein:
    the set of basis entities is based on a codebook,
    the codebook comprises vectors or matrices, and
    each of the vectors or matrices has a length or size, respectively, that depends on at least one of the value of P, a value of $N_3$, and a value of $N_4$.

8. The UE of claim 6, wherein:
    $P=sN_1N_2$,
    $N_1$ and $N_2$ are a number of antenna ports associated with two dimensions, respectively, of a two-dimensional planar antenna array, and
    $s\in\{1,2\}$ is a number of polarizations associated with each location in the two-dimensional planar antenna array.

9. The UE of claim 1, wherein:
    the transceiver is further configured to receive information about $K\geq1$ antenna port groups (AGs),
    the processor is further configured to:
        measure the K AGs, and
        determine the CSI report based on the measurement,
    the K AGs are measured via at least one of the X dimensions, and
    each of the K AGs includes at least one non-zero power (NZP) CSI-RS port.

10. A base station (BS) comprising:
    a processor; and
    a transceiver operably coupled with the processor, the transceiver configured to:

transmit information about a channel state information (CSI) report, the report based on at least two components: a set of basis entities and a set of coefficients; and receive the CSI report including at least one indicator indicating at least one of the set of basis entities and the set of coefficients, wherein the set of basis entities is based on X dimensions, wherein the set of coefficients is not based on the X dimensions and is from a set of convolutional-based coefficients, and wherein X is associated with the CSI report and $X \geq 1$.

11. The BS of claim 10, wherein the set of convolutional-based coefficients is based on a machine-learning (ML) or artificial intelligence (AI) based algorithm.

12. The BS of claim 11, wherein:

the ML or AI based algorithm is based on a training using a predetermined set of coefficients from a codebook, the information indicates a type of the set of coefficients, the type indicated from among (a) a convolutional-based coefficients, which are learnt or adaptive, and (b) codebook-based coefficients, which are fixed or predetermined, and the CSI report is based on the indicated type of the set of coefficients.

13. The BS of claim 10, wherein:

each basis entity in the set of basis entities is a vector, and the vector is at least one of the following vector types:
separate for each dimension of the X dimensions, and
joint across at least two of the X dimensions.

14. The BS of claim 10, wherein:

each basis entity in the set of basis entities is a matrix, and the matrix is at least one of the following matrix types:
a Kronecker product of at least two vectors, and
joint across at least two of the X dimensions.

15. The BS of claim 10, wherein:

X=3, a first of the X=3 dimensions is associated with a spatial-domain (SD), a second of the X=3 dimensions is associated with a frequency-domain (FD), and a third of the X=3 dimensions is associated with a time-domain (TD), P is a number of SD units, $N_3$ is a number of FD units, and $N_4$ is a number of TD units, a value of P is based on properties associated with antenna ports, the properties being at least one of: (i) antenna structure, (ii) antenna polarization, (iii) antenna geometry including a shape or size, and (iv) locations including co-located or non-co-located, and $P \geq 1$, $N_3 \geq 1$, and $N_4 \geq 1$.

16. The BS of claim 15, wherein:

the set of basis entities is based on a codebook, the codebook comprises vectors or matrices, and each of the vectors or matrices has a length or size, respectively, that depends on at least one of the value of P, a value of $N_3$, and a value of $N_4$.

17. The BS of claim 15, wherein:

$P = sN_1 N_2$, $N_1$ and $N_2$ are a number of antenna ports associated with two dimensions, respectively, of a two-dimensional planar antenna array, and $s \in \{1,2\}$ is a number of polarizations associated with each location in the two-dimensional planar antenna array.

18. The BS of claim 10, wherein:

the transceiver is further configured to transmit information about $K \geq 1$ antenna port groups (AGs), the CSI report is based on measurement of the K AGs, the K AGs are measured via at least one of the X dimensions, and each of the K AGs includes at least one non-zero power (NZP) CSI-RS port.

19. A method performed by a user equipment (UE), the method comprising:

receiving information about a channel state information (CSI) report, the report based on at least two components: a set of basis entities and a set of coefficients;

based on the information, determining the set of basis entities and the set of coefficients; and transmitting the CSI report including at least one indicator indicating at least one of the set of basis entities and the set of coefficients, wherein the set of basis entities is based on X dimensions, wherein the set of coefficients is not based on the X dimensions and is from a set of convolutional-based coefficients, and wherein X is associated with the CSI report and $X \geq 1$.

20. The method of claim 19, wherein:

the set of convolutional-based coefficients is based on a machine-learning (ML) or artificial intelligence (AI) based algorithm, the ML or AI based algorithm is based on a training using a predetermined set of coefficients from a codebook, the information indicates a type of the set of coefficients, the type indicated from among (a) a convolutional-based coefficients, which are learnt or adaptive, and (b) codebook-based coefficients, which are fixed or predetermined, and the method further comprises:
identifying the type of the set of coefficients; and
determining the CSI report based on the identified type of the set of coefficients.

* * * * *